United States Patent
Kong

(10) Patent No.: US 9,430,051 B2
(45) Date of Patent: Aug. 30, 2016

(54) KEYBOARD WITH INPUT-SENSITIVE DISPLAY DEVICE

(71) Applicant: Microsoft Technology Licensing, LLC, Redmond, WA (US)

(72) Inventor: Yuan Kong, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/903,048

(22) Filed: May 28, 2013

(65) Prior Publication Data

US 2013/0257741 A1 Oct. 3, 2013

Related U.S. Application Data

(63) Continuation of application No. 13/014,741, filed on Jan. 27, 2011, now Pat. No. 8,451,242, which is a continuation of application No. 11/170,062, filed on Jun. 30, 2005, now Pat. No. 7,884,804, which is a continuation-in-part of application No. 10/427,430, filed on Apr. 30, 2003, now Pat. No. 7,119,794.

(51) Int. Cl.
*G06F 3/02* (2006.01)
*G06F 17/00* (2006.01)
(Continued)

(52) U.S. Cl.
CPC ........... *G06F 3/0213* (2013.01); *G06F 1/1626* (2013.01); *G06F 1/1632* (2013.01);
(Continued)

(58) Field of Classification Search
USPC ................................. 345/168, 173; 715/256
See application file for complete search history.

(56) References Cited

U.S. PATENT DOCUMENTS 4,121,204 A 10/1978 Welch et al.
4,369,439 A 1/1983 Broos
(Continued)

FOREIGN PATENT DOCUMENTS

DE 3910977 A1 10/1990
DE 10128192 A1 7/2002
(Continued)

OTHER PUBLICATIONS

Internet printout: http://www.nec-design.co.ip/showcase/ Resonantware Near Future Ubiquitous Networking Devices Visualized by Designers, dated Apr. 11, 2005.
(Continued)

*Primary Examiner* — Kenneth Bukowski
(74) *Attorney, Agent, or Firm* — Judy Yee; Qudus Olaniran; Micky Minhas

(57) ABSTRACT

An input/output device is disclosed that includes an input-sensitive display screen and alphanumeric keys for entering characters. The input-sensitive display screen may be positioned proximate the alphanumeric keys and be capable of displaying graphical information and sensing user selection of the graphical information. The input-sensitive display screen may include a combination display/input region and a non-display input region. The touch sensitive display screen may be detachable from the alphanumeric region and may be operable in a detached configuration. The input/output device may usable with a method of input correction. The method may include displaying, on a secondary display, a first text unit, such as a character or a word, which corresponds with a second text unit shown on a primary display screen of a computing device. The method further involves receiving user selection of the first text unit and replacing the first text unit with a second text unit.

20 Claims, 28 Drawing Sheets

(51) Int. Cl.
- *G06F 1/16* (2006.01)
- *G06F 3/01* (2006.01)
- *G06F 3/023* (2006.01)
- *G06F 3/0354* (2013.01)
- *G06F 17/27* (2006.01)

(52) U.S. Cl.
CPC .............. *G06F 3/018* (2013.01); *G06F 3/021* (2013.01); *G06F 3/0219* (2013.01); *G06F 3/0236* (2013.01); *G06F 3/0237* (2013.01); *G06F 3/03547* (2013.01); *G06F 17/273* (2013.01); *G06F 2203/0339* (2013.01)

(56) References Cited

U.S. PATENT DOCUMENTS

| | | |
|---|---|---|
| 4,823,634 A | 4/1989 | Culver |
| 4,974,183 A | 11/1990 | Miller |
| 5,367,453 A | 11/1994 | Capps et al. |
| 5,503,484 A | 4/1996 | Louis |
| 5,682,439 A | 10/1997 | Beernink et al. |
| 5,748,512 A | 5/1998 | Vargas |
| 5,764,218 A | 6/1998 | Della Bona |
| 5,847,698 A | 12/1998 | Reavey et al. |
| 5,859,629 A | 1/1999 | Tognazzini |
| 5,875,311 A | 2/1999 | Bertram et al. |
| 6,032,053 A | 2/2000 | Schroeder et al. |
| 6,043,809 A | 3/2000 | Holhan |
| 6,073,146 A * | 6/2000 | Chen .............................. 715/264 |
| 6,307,549 B1 | 10/2001 | King et al. |
| 6,429,847 B1 | 8/2002 | Johnson |
| 6,525,717 B1 | 2/2003 | Tang |
| 6,549,878 B1 | 4/2003 | Lowry et al. |
| 6,567,549 B1 * | 5/2003 | Marianetti, II ..... G06F 3/04883 382/188 |
| 6,801,190 B1 | 10/2004 | Robinson et al. |
| 6,822,640 B2 | 11/2004 | Derocher |
| 6,902,332 B2 | 6/2005 | McLoone |
| 7,034,777 B1 | 4/2006 | McLarty et al. |
| 7,098,896 B2 | 8/2006 | Kushler et al. |
| 7,119,794 B2 | 10/2006 | Kong |
| 7,221,330 B2 | 5/2007 | Finke-Anlauff |
| 7,486,277 B2 | 2/2009 | Kong |
| 7,884,804 B2 | 2/2011 | Kong |
| 8,451,242 B2 | 5/2013 | Kong |
| 2002/0103951 A1 | 8/2002 | Huber et al. |
| 2003/0167230 A1 * | 9/2003 | McCarthy ........................ 705/40 |
| 2003/0188144 A1 | 10/2003 | Du et al. |
| 2003/0193481 A1 * | 10/2003 | Sokolsky ...................... 345/173 |
| 2004/0108968 A1 | 6/2004 | Finke-Anlauff |
| 2004/0131078 A1 | 7/2004 | Gupta et al. |
| 2004/0155869 A1 * | 8/2004 | Robinson et al. ............ 345/168 |
| 2004/0172258 A1 | 9/2004 | Dominach et al. |
| 2004/0174345 A1 | 9/2004 | Tsang |
| 2005/0076088 A1 | 4/2005 | Kee et al. |
| 2006/0052885 A1 | 3/2006 | Kong |
| 2006/0256088 A1 | 11/2006 | Kong |
| 2011/0148767 A1 | 6/2011 | Kong |

FOREIGN PATENT DOCUMENTS

| | | | |
|---|---|---|---|
| JP | | 63-313220 A | 12/1988 |
| JP | | 11196353 A | 7/1999 |
| JP | | 2001-092821 | 4/2001 |
| KR | | 1020020010151 A | 2/2002 |
| TW | | 416036 | 12/2000 |
| TW | | 547715 | 8/2003 |
| TW | | 200306469 | 11/2003 |
| TW | | 589577 | 6/2004 |
| TW | | 200411526 | 7/2004 |
| TW | | M250242 | 11/2004 |
| TW | | M254663 | 1/2005 |
| TW | | M260945 | 4/2005 |
| TW | | 233041 | 5/2005 |
| WO | | WO 99/34574 | 7/1999 |
| WO | | WO 00/38041 | 6/2000 |
| WO | | WO 00/68771 | 11/2000 |
| WO | | WO 01/33324 A2 | 5/2001 |
| WO | | WO 02/27455 | 4/2002 |

OTHER PUBLICATIONS

Internet printout: http://www.logitech.com/index.cfm/products/details—Logitech products Keyboard & Mouse Combinations, dated Apr. 11, 2005.
Internet printout: http://www.nec-design.co.ip/showcase—duophone, dated Apr. 11, 2005.
Internet printout: http://www.logitech.com/index.cfm/products/details—Logitech® deNovo™ Media Desktop™, dated Apr. 11, 2005.
International Search Report dated Apr. 25, 2008 cited in International Application No. PCT/US06/18477.
Chinese First Office Action dated Aug. 25, 2010 cited in Application No. 200680019726.3.
Chinese Second Office Action dated Apr. 18, 2011 cited in Application No. 200680019726.3.
Taiwanese Notice of Allowance dated Dec. 30, 2013 cited in Application No. 95117914, 4 pgs.
NJStar Software Corp., "Introducing NJStar Chinese WP 6.0", Author: Unknown, http://www.njstar.com/cms/, Oct. 2, 2014, 3 pgs.
Chinese Notice of Allowance in Application No. 200680019726,3, mailed Sep. 19, 2011, 4 pgs.
Chinese Notice of Withdraw in Application 200680019726.3, mailed on Sep. 26, 2008, 2 pgs.
European Office Action in Application 04006950.2, mailed Oct. 8, 2015,5 pgs.
European Office Action in Application 04006950,2, mailed Jun. 22, 2012, 8 pgs.
European Office Action in Application 04006950.2, mailed Jul. 15, 2013, 5 pgs.
European partial Search Report in Application 04006950.2, mailed Oct. 24, 2011, 5 pgs.
Japanese Final Office Action in Application 2004-085664, mailed Oct. 30, 2009, 4 pgs.
Japanese Notice of Allowance in Application 2010-040489, mailed Aug. 23, 2011, 6 pgs.
Japanese Office Action in Application 2004-085664, mailed Jun. 9, 2009, 9 pgs.
Japanese Written Appeal in Application 2004-085664, filed Feb. 25, 2010, 2 pgs.
Korean Notice of Preliminary Rejection in Application 10-2004-21245, mailed Sep. 16, 2010, 7 pgs.
Microsoft Corp., "Microsoft Pinyin IME" 46 pages; copyright 2003.
Taiwan Office Action and Search Report in Application 095117914, mailed Jan. 23, 2013, 12 pgs.
U.S. Appl. No. 11/177,830, Amendment and Reasponse filed Mar. 11, 2008, 7 pgs.
U.S. Appl. No. 11/177,830, Amendment and Reasponse filed Sep. 4, 2008, 7 pgs.
U.S. Appl. No. 11/177,830, Notice of Allowance mailed Nov. 19, 2008, 6 pgs.
U.S. Appl. No. 11/177,830, Notice of Allowance mailed Sep. 19, 2008, 4 pgs.
U.S. Appl. No. 11/177,830, Office Action mailed Oct. 11, 2007, 7 pgs.
U.S. Appl. No. 11/177,830, Office Action mailed Apr. 21, 2008, 7 pgs.
U.S. Appl. No. 10/427,430, Advisory Action mailed Feb. 24, 2006, 3 pgs.
U.S. Appl. No. 10/427,430, Amendment and Response filed Oct. 25, 2005, 11 pgs.
U.S. Appl. No. 10/427,430, Amendment and Response filed Feb. 13, 2006, 13 pgs.
U.S. Appl. No. 10/427,430, Amendment and Response filed Jun. 27, 2006, 5 pgs.
U.S. Appl. No. 10/427,430, Notice of Allowance mailed Jul. 27, 2006, 4 pgs.
U.S. Appl. No. 10/427,430, Office Action mailed Dec. 13, 2005, 9 pgs.

(56) References Cited

OTHER PUBLICATIONS

U.S. Appl. No. 10/427,430, Office Action mailed Apr. 27, 2006, 8 pgs.
U.S. Appl. No. 10/427,430, Office Action mailed Jul. 25, 2005, 7 pgs.
U.S. Appl. No. 11/170,062, Advisory Action mailed Sep. 30, 2009, 3 pgs.
U.S. Appl. No. 11/170,062, Amendment and Response filed Apr. 23, 2010, 11 pgs.
U.S. Appl. No. 11/170,062, Amendment and Response filed May 12, 2009, 10 pgs.
U.S. Appl. No. 11/170,062, Amendment and Response filed May 12, 2009, 13 pgs.
U.S. Appl. No. 11/170,062, Notice of Allowance mailed Oct. 1, 2010, 6 pgs.
U.S. Appl. No. 11/170,062, Office Action mailed Jan. 12, 2009, 9 pgs.
U.S. Appl. No. 11/170,062, Office Action mailed Mar. 18, 2010, 9 pgs.
U.S. Appl. No. 11/170,062, Office Action mailed Sep. 1, 2009, 5 pgs.
U.S. Appl. No. 11/491,397, Advisory Action mailed Jan. 4, 2008, 3 pgs.
U.S. Appl. No. 11/491,397, Amendment and Response filed Dec. 11, 2007, 10 pgs.
U.S. Appl. No. 11/491,397, Office Action mailed Oct. 11, 2007, 10 pgs.
U.S. Appl. No. 13/014,741, Amendment and Response filed Oct. 17, 2012, 10 pgs.
U.S. Appl. No. 13/014,741, Notice of Allowance mailed Jan. 30, 2013, 5 pgs.
U.S. Appl. No. 13/014,741, Office Action mailed Jul. 18, 2012, 10 pgs.

* cited by examiner

KEYBOARD WITH INPUT-SENSITIVE DISPLAY DEVICE

RELATED APPLICATIONS

This application is a Continuation of U.S. application Ser. No. 13/014,741 entitled "Keyboard with Input-Sensitive Display Device" filed Jan. 27, 2011, which issued on May 28, 2013 as U.S. Pat. No. 8,451,242, which is a Continuation of U.S. application Ser. No. 11/170,062 entitled "Keyboard with Input-Sensitive Display Device" filed Jun. 30, 2005, which issued on Feb. 8, 2011 as U.S. Pat. No. 7,884,804, which is a Continuation-in-Part of U.S. application Ser. No. 10/427,430 filed Apr. 30, 2003, which issued on Oct. 10, 2006 as U.S. Pat. No. 7,119,794, which are incorporated herein by reference.

BACKGROUND

As the field of computer science has evolved, a variety of data entry techniques have been developed to enhance the individual's experience and to make computers more versatile. For example, a typical computer system, especially a computer system using graphical user interfaces for user interaction may be optimized for accepting input from one or more discrete input devices. Thus, an individual may enter text with a keyboard, and control the position of a pointer image on a display screen with a pointing device, such as a mouse, having one or more buttons for activating selections associated with the location of the pointer. Some computing systems even have included a pen-like stylus that can be used as a multipurpose data input device.

A variety of software applications have been developed that permit an individual to form data files by entering characters with a keyboard or other input device. As utilized herein, the term character is intended to encompass a symbol or other figure that may be entered by the individual. Examples of characters include alphabetic characters, whether from the Roman, Cyrillic, Arabic, Hebrew, or Greek alphabets, for example. Furthermore, a character may be a numeral, a punctuation mark, or one of the various symbols that are commonly utilized in written text, such as $, #, %, &, or @, for example. In addition, a character may be one of the various symbols utilized in Asian languages, such as the Chinese, Japanese, and Korean languages. Groups of various characters that form words or word-type units are hereby defined as a text unit.

Although conventional character entry with a keyboard is generally considered to be a convenient and expedient process, an average individual frequently enters incorrect characters and is required to modify the incorrect characters with the intended or correct characters. A common method of modifying the incorrect characters involves the use of a pointing device, for example a mouse or trackball. In order to modify the incorrect characters, the individual will cease entering characters and move one hand to the pointing device, and attempt to manipulate the pointing device to position the cursor to the incorrect character within the entire viewable X-Y field. The individual will then delete the incorrect character, replace the incorrect character with the intended or correct character, and manipulate the pointing device to move the cursor to another location which is typically the prior location of the cursor immediately before the edit. Alternately, various spell-checking programs may be utilized, for example, and some individuals may employ variations or combinations of these methods for modifying the incorrect characters. Such is normally done at the completion of the document in view of the potential disruption to the data entering process. In either event, however, the individual generally redirects attention from the keyboard to the pointing device when modifying the incorrect characters, which may decrease the efficiency of the individual, particularly when repetitively performed. Similar considerations apply to the correction of text units.

The error rate for an average individual utilizing a QWERTY keyboard for phonics-based Asian language input can be as high as 20% or worse. The error rate for an average individual utilizing a QWERTY keyboard to enter characters in the English language, for example, is generally significantly less. Accordingly, phonics-based Asian language input has a greater error rate, which further decreases the efficiency of the individual. The increased error rate for phonics-based Asian language input is directly related to the characteristics of the Asian languages. With regard to the Chinese language, for example, there are tens of thousands of characters, but only approximately 400 corresponding pronunciations, and adding four tones to the pronunciations expands the total number of pronunciations to approximately 1600. Given the relatively large number of characters utilized in the Chinese language, many different characters have similar pronunciations and are, therefore, phonetically-similar. Coupled with the expanding Chinese vocabulary, the number of similar pronunciations introduces an intrinsically-high error rate in phonics-based Chinese language input. Similar considerations apply to the Japanese and Korean languages.

Concepts related to phonics-based Asian language input and a conventional method of correcting characters in phonics-based Asian language input will now be discussed. For purposes of illustration, a Chinese language version of phonics-based Asian language input, which is generally referred to as Pinyin, will be utilized herein. One skilled in the relevant art will appreciate, however, that similar concepts may be applied to other Asian languages. In general, a QWERTY keyboard is utilized for Pinyin input to enter Roman characters and combinations of Roman characters that phonetically represent the intended Chinese character. A software application then processes the Roman characters and converts the Roman characters to a corresponding Chinese character that is similar-similar. As discussed above, many different characters have similar pronunciations and are similar-similar. Accordingly, the software application may convert the Roman characters to an incorrect or unintended Chinese character that is similar-similar to the intended Chinese character.

When an incorrect Chinese character is identified by the individual, in an existing system, the pointing device may be moved to place the cursor before and immediately adjacent to the incorrect Chinese character. A list of potential replacement Chinese characters is then displayed adjacent to the incorrect Chinese character. The individual manipulates the pointing device to select the correct Chinese character from the list. In many instances, the list may display only a portion of the total number of potential replacement Chinese characters, which may correspond with the Chinese characters that are most likely to be used on a statistical basis. Accordingly, the individual may be required to scroll through numerous lists before finding the correct Chinese character. Once the correct Chinese character is located and selected, the software application replaces the incorrect Chinese character with the correct Chinese character and the individual may continue entering characters until another incorrect Chinese character is identified. The cursor remains at the location of the corrected Chinese character and the individual will typically move the pointing device to the end of the line or document to continue entering data into the document.

Due to the relatively high error rate for phonics-based Asian language input, individuals are required to frequently identify incorrect characters and then identify the correct characters from lists of possible replacement characters, as discussed above. One skilled in the relevant art will recognize that this process may be time-consuming and inefficient given an approximate error rate of 20% or more for an average individual utilizing a QWERTY keyboard for phonics-based Asian language input.

SUMMARY

Aspects of the present invention involve an integrated computer input/output device having an input-sensitive display screen, such as a touch-sensitive screen or a proximity sensitive screen, and alphanumeric keys for entering characters. The input-sensitive display screen is positioned proximate the alphanumeric keys and is capable of displaying graphical information and sensing user selection of the graphical information. The input-sensitive display screen may include a combination display/input region and a non-display input region, such as a touch pad region. The input-sensitive display screen may be detachable from the alphanumeric region and may be operable in a detached configuration.

Other aspects of the invention involve a method for input correction. The method includes displaying, on a secondary display, a first text unit, such as a character or a word, which corresponds with a second text unit shown on a primary display screen of a computing device. The method further involves receiving user selection of the first text unit and replacing the second text unit with the first text unit. The secondary display may include a touch sensitive display screen and the step of receiving the user selection of the first text unit may include sensing the user touching the touch sensitive display screen.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

BRIEF DESCRIPTION OF THE DRAWINGS

The foregoing Summary and following Detailed Description of the Drawings will be better understood when read in conjunction with the accompanying drawings.

DETAILED DESCRIPTION

The following discussion and accompanying figures disclose an input device in accordance with aspects of the present invention, which may include a combination input/output device. The input device may be utilized for entering characters or for other functionality. If an incorrect text unit, such as a character or a word, is inadvertently entered or is otherwise present, the input device can be utilized to modify the incorrect text unit with the intended or correct text unit. More specifically, a sensor coupled to the input device may be utilized by an individual to select the incorrect text unit and then replace the incorrect text unit with the correct text unit. The input device as disclosed in many of the following configurations is a keyboard. One skilled in the relevant art will recognize, however, that a plurality of other input devices having a sensor for replacing an incorrect text unit will also fall within the scope of the present invention.

As used herein, the phrase "text unit" is defined as characters and groups of characters that form words or word-type units. For example, in the English language, the term text unit refers to characters and words. Accordingly, a character-based editing system can be used to replace bits of texts on a character-by-character basis, and a word-based editing system can be used to replace text on a word-by-word basis. A text unit-based editing system would be a generic term encompassing both character-based and word-based editing systems.

Figure 1:
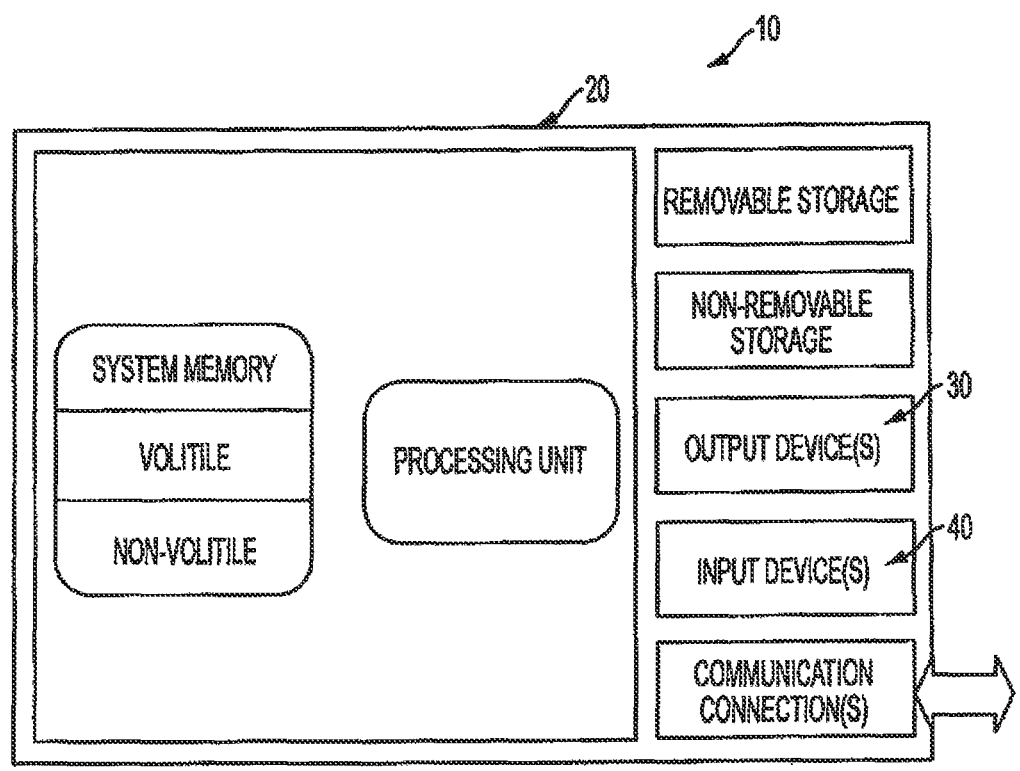
FIG. 1 is a schematic view of an operating environment.
Figure 2:
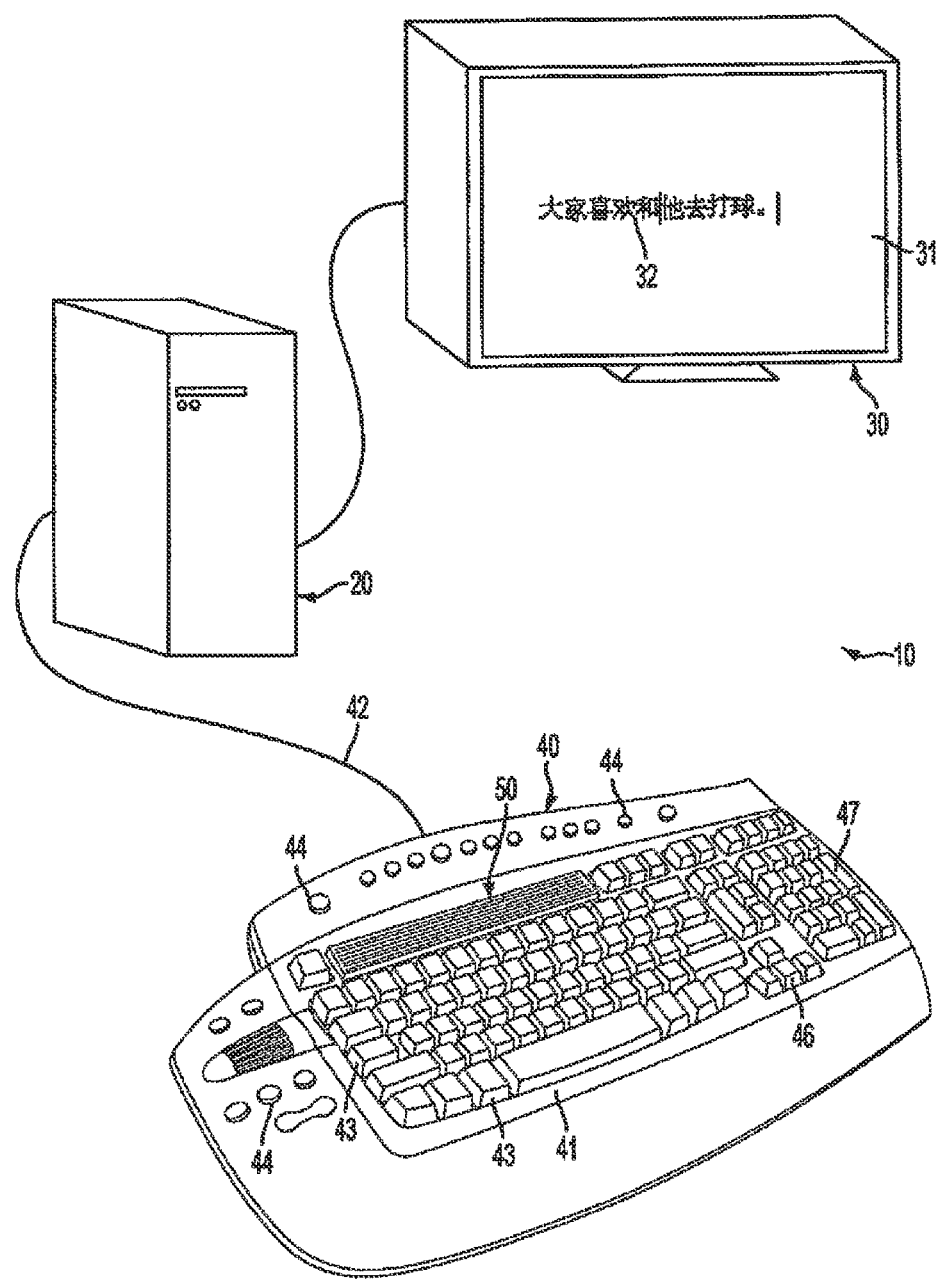
FIG. 2 is an exemplary perspective view of the operating environment, which depicts a host computer, an output device, and an input device.

As will be appreciated by those of ordinary skill in the art, the input device may be utilized in connection with a computer operating environment. That is, the signals transmitted by the input device may be governed by computer-executable instructions, such as program modules, executed by one or more computing devices. It may be helpful, therefore, to briefly discuss the components and operation of a typical operating environment on which various embodiments of the invention may be employed. FIGS. 1 and 2 illustrate examples of an operating environment 10, in which various embodiments of the invention may be implemented. The operating environment 10 is only one example of a suitable operating environment, however, and is not intended to suggest any limitation as to the scope of use or functionality of the invention. Other well known operating environments or configurations that may be suitable for use with the invention include, but are not limited to server computers, hand-held or laptop devices, multiprocessor systems, microprocessor-based systems, programmable consumer electronics, network PCs, minicomputers, mainframe computers, distributed computing environments that include any of the above systems or devices, and the like.

The operating environment 10 includes a host computer 20 that is operatively connected to an output device 30, such as a computer monitor, and an input device 40, which may be a keyboard, for example. One skilled in the relevant art will recognize that one or more data files may be processed by the host computer 20 and a signal may be transmitted to the output device 30, thereby directing the output device 30 to render an image 32 on a display screen 31. The input device 40 is utilized in connection with the host computer 20 to enter data, which may take the form of a plurality of characters, as described in greater detail below.

The host computer 20 typically includes at least some form of computer readable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, punched media, holographic storage, or any other medium which can be used to store the desired information.

In its most basic configuration, the host computer 20 typically includes a processing unit and system memory. Depending on the exact configuration and type of the host computer 20, the system memory may include volatile memory (such as RAM), non-volatile memory (such as ROM, flash memory, etc.), or some combination of the two memory types. Additionally, the host computer 20 may also have mass storage devices, such as a removable storage device, a non-removable storage device, or some combination of two storage device types. The mass storage devices can be any device that can retrieve stored information, such as magnetic or optical disks or tape, punched media, or holographic storage. As will be appreciated by those of ordinary skill in the art, the system memory and mass storage devices are examples of computer storage media.

The operating environment 10 may also have one or more additional input devices that are operatively connected to the host computer 20, such as a pointing device, microphone, or scanner, for receiving input from an individual. Furthermore the operating environment 10 may have one or more additional output devices operatively connected to the host computer 20, such as a speaker, printer, or a tactile feedback device, for outputting data to an individual. Other components of the operating environment 10 may include communication connections to other devices, computers, networks, servers, etc. using either wired or wireless media. All of these devices and connections are well know in the art and thus will not be discussed at length here.

The output device 30 is depicted as a computer monitor that is operatively connected to host computer 20. The image 32 may represent a data file, such as a text document, digital photograph, spreadsheet, or Web page, for example. The input device 40 is depicted individually in FIGS. 3 and 4 as a keyboard. As is well-known in the art, one purpose of the input device 40 is to selectively enter data, which generally takes the form of a plurality of characters and text units that may be displayed as a portion of the image 32 on the display screen 31. As described in the Background of the Invention section above, the term character is intended to encompass a symbol or other figure that may be entered by the individual. Examples of characters include alphabetic characters, whether from the Roman, Cyrillic, Arabic, Hebrew, or Greek alphabets, for example. Furthermore, a character may be a numeral, a punctuation mark, or one of the various symbols that are commonly utilized in written text, such as $, #, %, &, or @, for example. In addition, a character may be one of the various symbols utilized in Asian languages, such as the Chinese, Japanese, and Korean languages. Groups of various characters that are intended to form words or word-type units are included within the definition of a text unit.

A housing 41 forms an exterior of the input device 40, and a cord 42 extends from the housing 41 in order to transmit signals from the input device 40 to the host computer 20. Alternately, a conventional wireless connection between the input device 40 and the host computer 20 may also be utilized, as is well-known in the art. The signals that are transmitted by the cord 42 are typically generated in response to manipulation of one of a plurality of keys 43, buttons 44, or other input elements. Furthermore, the signals may be generated by a sensor 50 that has an elongate configuration and is laterally-oriented with respect to the input device 40.

The keys 43 of the input device 40 are generally arranged in a conventional manner and are positioned within an alphanumeric region 45, an arrow region 46, and a number-pad region 47, for example. The alphanumeric region 45 has the configuration of a conventional QWERTY keyboard, but may alternatively have the configuration of an AZERTY keyboard, or any other desirable keyboard configuration within the scope of the present invention. Accordingly, the alphanumeric region 45 includes a plurality of keys 43 that are associated with individual alphabetic characters, which may be alphabetic characters of the Roman alphabet, for example. A first row of the alphanumeric region 45 may also include various keys 43 that are associated with numbers as the primary characters. The keys of first row may also provide various symbols, such as !, @, #, $ and %, that are accessed in an alternative mode by depressing one a shift key simultaneously with such keys 43. In addition, the alphanumeric region 45 may include an enter key, a control key, and a space bar, for example, as is commonly known. Within the scope of the present invention, however, alphanumeric region 45 may have a plurality of configurations and may contain keys 43 with a variety of functions or purposes.

Arrow region 46 includes four keys 43*u*, 43*r*, 43*d*, and 43*l* that are respectively associated with an up arrow, a right arrow, a down arrow, and a left arrow and are commonly utilized to move the cursor 33 relative to display screen 31. Numberpad region 47 also includes a plurality of keys 43 with various numbers as the primary characters. In operation, the individual may utilize numberpad region 47 to quickly enter numeric characters due to the arrangement of the keys 43 in the numberpad region 47. The numberpad region 47 may also include a second enter key. Additionally, the buttons 44 are positioned laterally across a top portion of input device 40. Suitable uses for the buttons 44 include launching pre-designated software applications; adjusting the volume or intensity of an output device, such as a speaker; modifying power levels of host computer 20; or providing basic controls for a media player, for example. Additionally, an input region 48 may be provided and laterally-spaced from the alphanumeric region 43 to provide enhanced input capabilities and may include a scroll wheel, an application switching device, editing keys (such as cut, copy, and paste), and Internet browser control keys (such as forward and back). Details of aspects of the keyboard are disclosed in U.S. Patent Application Number 20020159809, published Oct. 31, 2002, which is hereby incorporated by reference for its entirety. Based upon the above discussion regarding the layout and positioning of the keys 43 and the regions 45-48, one skilled in the relevant art will recognize that the input device 40 has a generally conventional configuration, with the exception of the presence of the sensor 50 and related supporting keys as utilized in certain illustrative embodiments of the invention. Within the scope of the present invention, however, the various components of the input device 40 may have a plurality of alternate arrangements.

For reference purposes, the input device 40 has a back edge 11 distal from the individual during normal use, and a front edge 12 adjacent the individual during normal use. Accordingly, an object is said herein to be "behind" another object when it is between that object and the back edge 11. An object is said herein to be "directly behind" another object when it is between that object and the back edge 11 and at least partially located within the lateral bounds of that object extending in the front-to-back direction. An object is said herein to be "entirely directly behind" another object when it is between that object and the back edge 11 and entirely located within the lateral bounds of that object extending in the front-to-back direction. An object is said herein to be "in front of" another object when it is between that object and the front edge 12. Further, the keyboard 40 also has right and left edges 13 and 14, respectively. The direction "lateral" defines the general directions from the left edge 14 to the right edge 13 and from the right edge 13 to the left edge 14.

Figure 3:
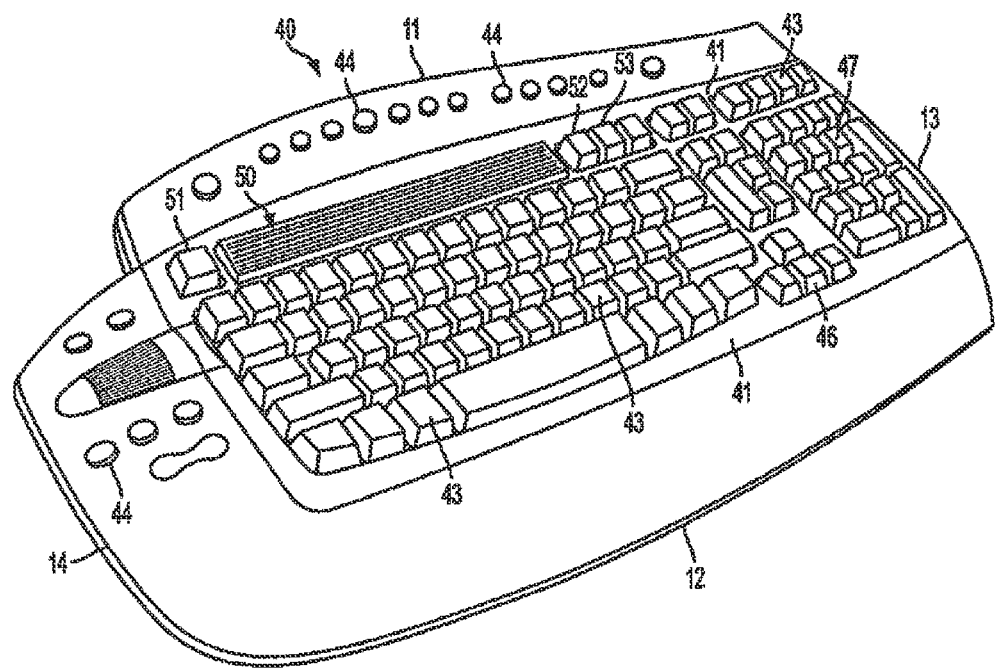
FIG. 3 is a perspective view of the input device.
Figure 4:
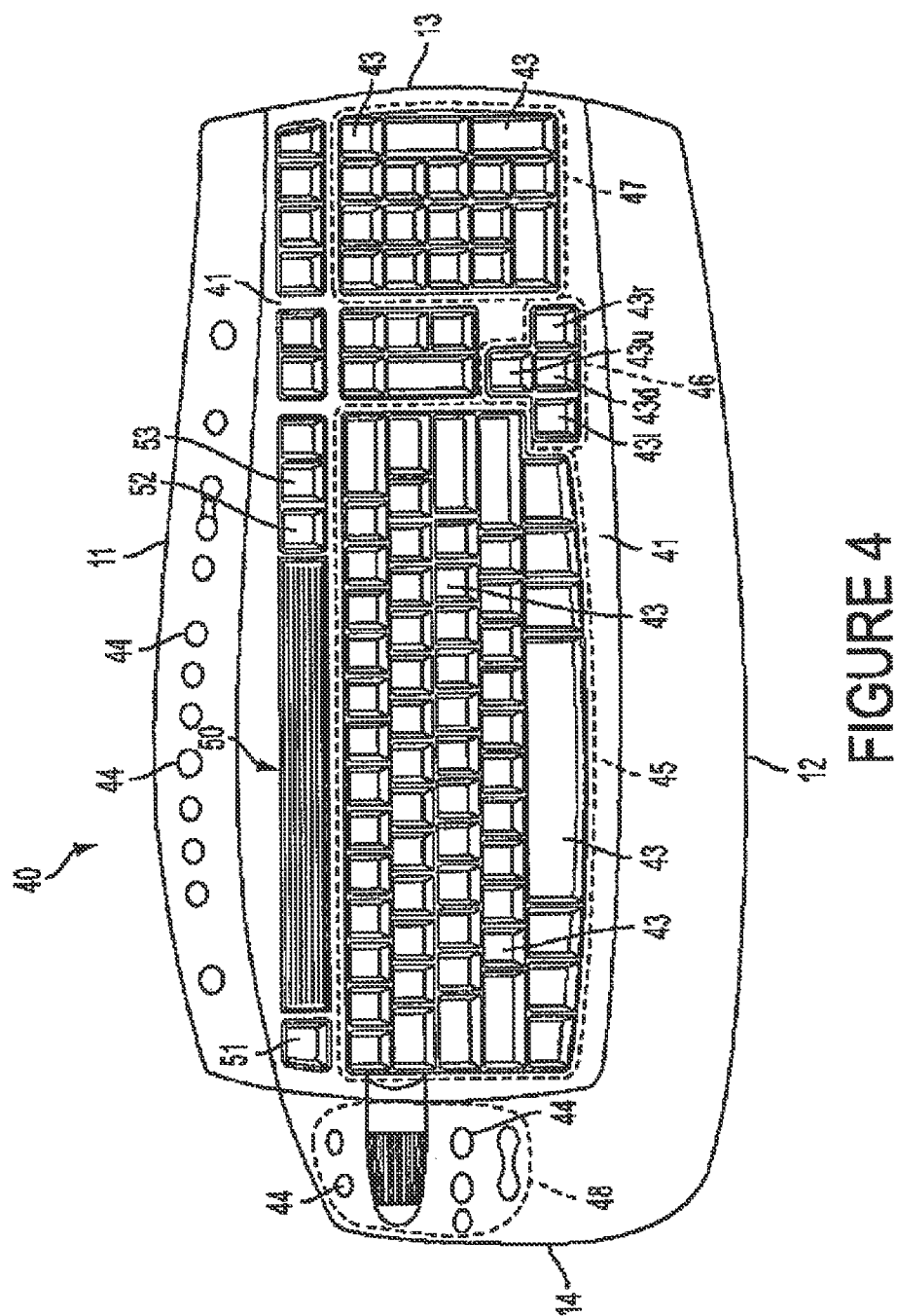
FIG. 4 is a top plan view of the input device.

In addition to the features of existing keyboards, the input device 40 also includes the sensor 50, which, in the depicted embodiment, is positioned behind and/or adjacent to, and more specifically, directly behind and entirely directly behind, the alphanumeric region 45. As depicted in FIGS. 3 and 4, the sensor 50 is adjacent to the rear portion of the alphanumeric region 45 and extends along and adjacent to the first row of the keys 43, which are generally associated with numeric characters. Within the scope of the present invention, the sensor 50 may be positioned in other portions of the input device 40. An advantage of placing the sensor 50 adjacent to the alphanumeric region 45 relates to accessibility. The alphanumeric region 45 is a frequently utilized portion of the input device 40. Accordingly, the hands of the individual are often positioned over the alphanumeric region 45 when utilizing the input device 40. By placing the sensor 50 adjacent to the alphanumeric region 45, the sensor 50 is highly accessible to the individual and can be manipulated by an individual with finger movements during alphanumeric entry with little or no displacement of the wrist and arms.

The sensor 50 has an elongate configuration and is laterally-oriented with respect to the input device 40. In other words, the length of the sensor 50 is greater than the width of the sensor 50, and the sensor 50 extends generally from a right side of the input device 40 to a left side of the input device 40. A ratio of the length to the width of the sensor 50 may be at least 3:1, but may also be 4:1 or 10:1 or greater, for example. In general, therefore, the ratio of the length to the width of the sensor 50 is in a range of 3:1 to 10:1, but may be more depending upon the specific application. Accordingly, the length of the sensor 50 may be significantly greater than the width of the sensor 50.

Figure 10:
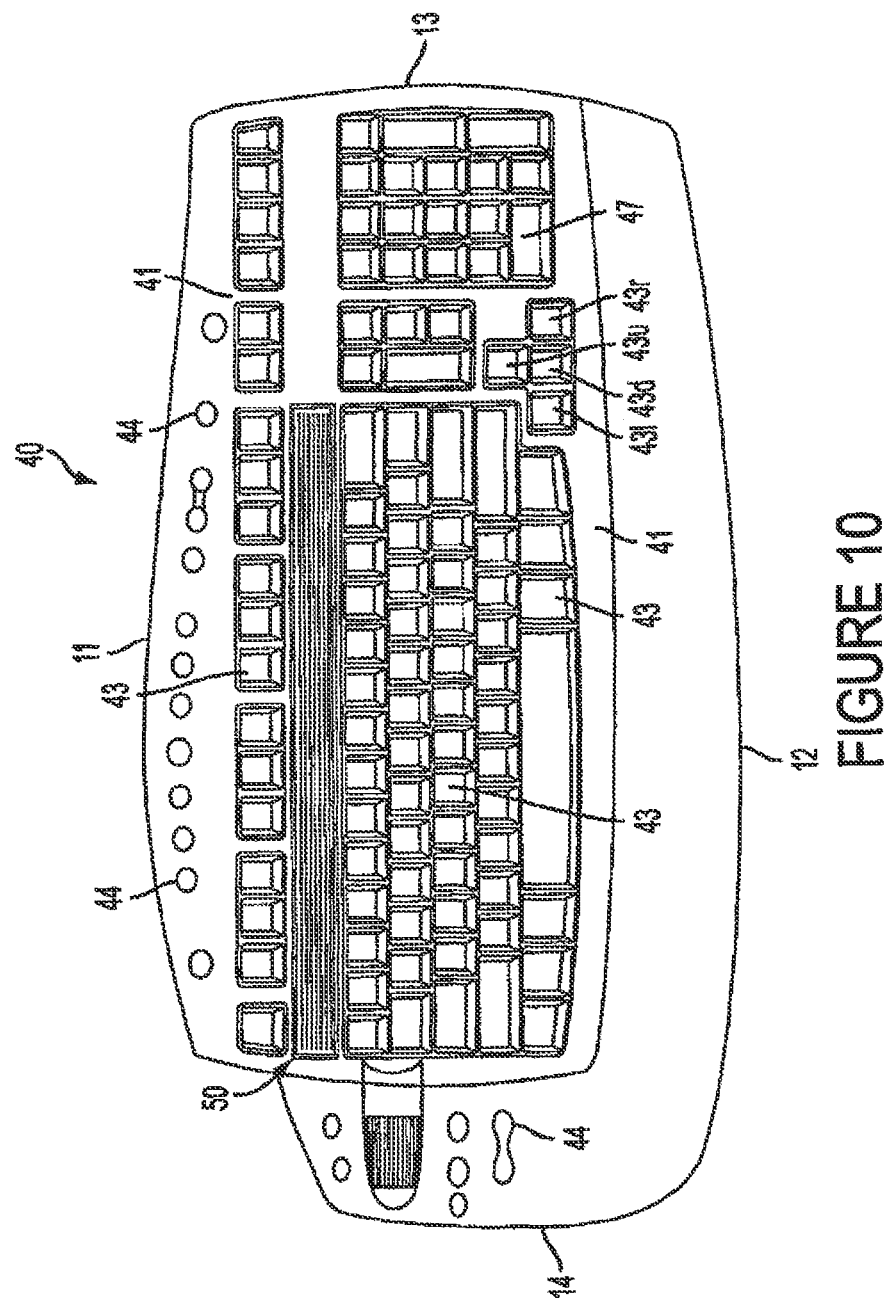
FIG. 10 is a top plan view of another input device.

Many conventional keyboards include a plurality of function keys that are designated by F1, F2, F3, etc. The sensor 50 may be located in the position that is conventionally reserved for the function keys, and actions associated with the function keys may be assigned to other ones of the keys 43, if desired. In applications where the function keys are to be preserved the sensor 50 may be positioned between the alphanumeric region 45 and the row of function keys such as shown in FIG. 10.

The sensor 50 may be a one-dimensional linear touch position sensor, such as a capacitive position sensing touchpad or other touch sensitive strip. Touch-sensitive strips, pads and, other such devices are well-known, such as the touch pad for cursor control commonly found on many laptop computers. The present sensor 50 may take advantage of such known technology and/or be physically configured in any way to create a touch-sensitive device. The sensor 50 may be sensitive to human touch and/or to non-human touch such as from a pen or stylus-type pointer. The sensor 50 also may be utilized without actually touching the surface of the sensor 50 with the pointer. For instance, the sensor 50 may be configured to detect the pointer position as it hovers just over the surface of the sensor 50, as is known in the art.

The sensor 50 is coupled to the input device 40, and one or more interfaces and/or driving circuitry/software may be utilized to provide communication between the sensor 50 and the host computer 20. Some or all of the interfaces and drivers, if any, may be located wherever is convenient, such as all within the input device 40 all within the host computer 20, or distributed between the two.

The sensor 50 may detect the position of a pointer along the sensor 50 in any of a variety of ways. For example, the sensor 50 may be a well-known capacitance-type sensor that senses changes in capacitance between two or more conductive nodes within the sensor 50. The conductive nodes do not electrically touch but generate a capacitance in the dielectric junction between the nodes. When a pointer, such as a human finger or stylus, approaches the junction, the capacitance may be altered due to the change in dielectric constant imposed by the pointer. Such a touch sensor 50 has the advantages of being able to sense not only touch but also proximity and pressure. The conductive nodes may be of any shape and size, such as wires and/or plates. Depending upon the specific embodiment, such a capacitive touch strip may detect pointer location with an accuracy of up to 0.001 inch or more. However, touch sensors with less precision can be effectively used.

The sensor 50 may alternatively be a resistance-type touch strip that detects variations in resistance based on the position of the pointer along the touch strip. Or, the sensor 50 may be an inductance-type touch strip that detects variations in inductance based on the position of the pointer along the touch strip. The sensor 50 may further incorporate infrared-sensing, laser, and/or ultrasonic technology that senses the position of the pointer.

Based upon the above discussion, the input device 40 may have the general configuration of a conventional keyboard. In contrast with a conventional keyboard, however, the input device 40 includes the sensor 50, which is positioned adjacent to the alphanumeric region 45. Within the scope of the present invention, the input device 40 may take the form of a plurality of other types of input devices, in addition to a keyboard. For example, the keypads of a conventional wireless telephone are often utilized to input characters and form text units, and a sensor having the form of the sensor 50 may be utilized in conjunction with the keypad. Furthermore, an input device having the configuration of a pointing device, such as a mouse or trackball, may also be utilized in some situations to input characters, and a sensor having the form of the sensor 50 may be utilized in conjunction with the pointing device. Accordingly, the input device 40 may have the general configuration of a variety of input devices. For purposes of the following discussion, however, the input device 40 will be discussed with regard to a keyboard, as depicted in FIGS. 3-4.

The text unit system of the present invention includes the text unit editing sensor 50 and supporting input elements that assist in the selection of a text unit to be replaced, the confirmation of a text unit to be replaced, the presentation of alternative choices of replacement text unit candidates for selection, the selection and/or confirmation of a replacement text unit, and the exiting of the text unit replacement mode. These supporting input elements can take various types of input elements and may include keys presently used on the keyboard of other uses, such as the arrow keys 43*u*, 43*d*, 43*r*, and/or 43*l*, and/or may include new or specifically dedicated input elements such as keys 51, 52, and 53 as shown in FIGS. 3-5, key 51 and toggle 55 as shown in FIG. 11, or toggle 56 as shown in FIG. 12, as is hereinafter described.

Figure 5:
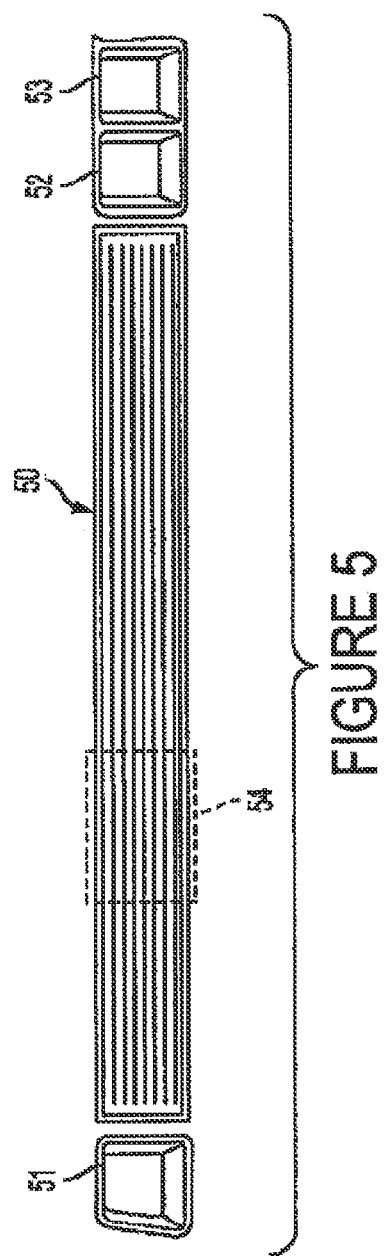
FIG. 5 is a top plan view of a portion of the input device.

With reference to FIG. 5, a portion of the input device 40 that includes the sensor 50 is depicted. A key 51 is positioned to the left of the sensor 50 and immediately adjacent to the sensor 50. Similarly, a key 52 is positioned to the right of the sensor 50 and immediately adjacent to the sensor 50, and a key 53 is positioned to the right of the key 52. For the embodiment of FIGS. 3-5, keys 51, 52, and 53 and the arrow keys 43*l*, 43*r*, 43*u*, and 43*d* are supporting input elements that assist in the selection of a text unit to be replaced, the confirmation of a text unit to be replaced, the presentation of alternative choices of replacement text unit candidates for selection, the selection and/or confirmation of a replacement text unit, and the exiting of the text unit replacement mode.

In the configuration of FIG. 10, wherein the sensor 50 is positioned between the alphanumeric region 45 and the function keys, the arrow keys 43*l*, 43*r*, 43*u*, and 43*d* are supporting input elements that assist in the selection of a text unit to be replaced, the confirmation of a text unit to be replaced, the presentation of alternative choices of replacement text unit candidates for selection, the selection and/or confirmation of a replacement text unit, and the exiting of the text unit replacement mode.

Figure 11:
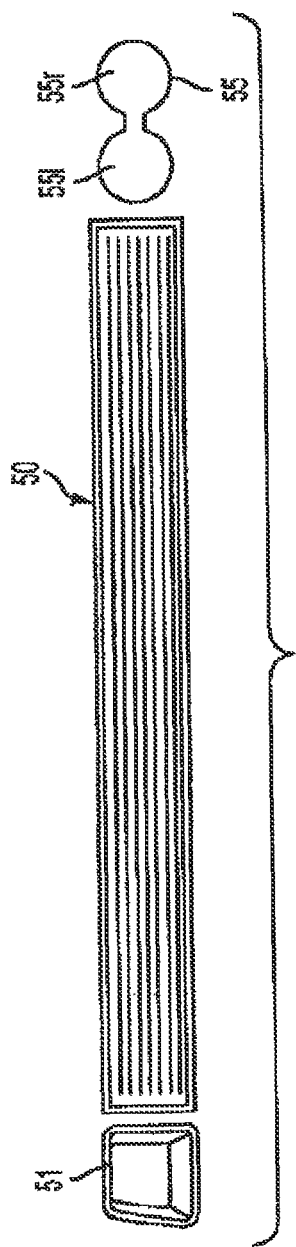
FIG. 11 is a top plan view of a portion of yet another input device.
Figure 12:
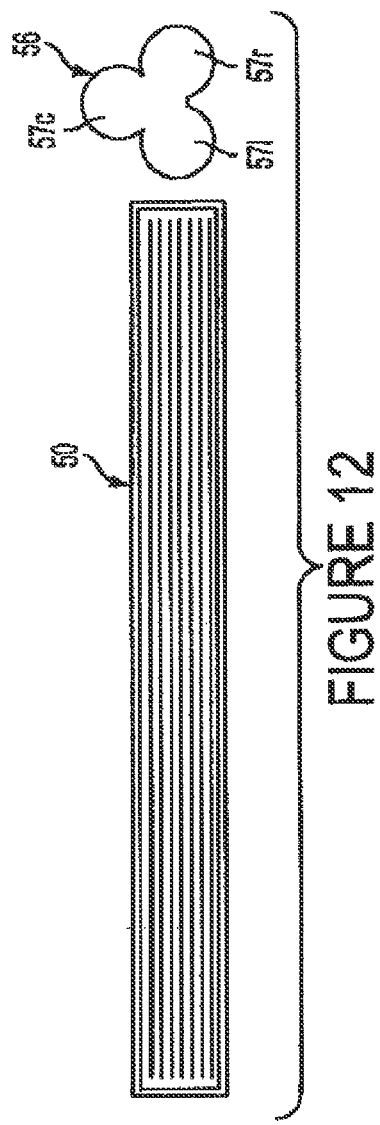
FIG. 12 is a top plan view of a portion of a further input device.

A third configuration is depicted in FIG. 11 and includes the sensor 50, the key 51, and a toggle key 55. The toggle key 55 is associated with two switches. When a right portion 55*r* of the toggle key 55 is depressed, a first of the switches is closed. Similarly, when a left portion 55*l* of the toggle key 55 is depressed, a second of the switches is closed. Accordingly, the individual may depress either the right or left side of the toggle key 55 to effect an action. In this configuration, the sensor 50 may be utilized as discussed above. In this arrangement, the toggle key 55 and key 51 are supporting input elements that assist in the selection of a text unit to be replaced, the confirmation of a text unit to be replaced, the presentation of alternative choices of replacement text unit candidates for selection, the selection and/or confirmation of a replacement text unit, and the exiting of the text unit replacement mode.

A fourth configuration of the editing region of the input device 40 is depicted in FIG. 12 and includes the sensor 50 and a three-way toggle key 56. The toggle key 56 includes three regions 57*a*, 57*b*, and 57*c*, and the individual may depress one of the regions 57*a*-57*c* at a single time. The sensor 50 may be utilized in conjunction with a plurality of supporting input elements, such as keys 51-53, toggle key 55, or toggle key 56. Thus, the regions 57*a*, 57*b*, and 57*c* of toggle key 56 are supporting input elements that assist in the selection of a text unit to be replaced, the confirmation of a text unit to be replaced, the presentation of alternative choices of replacement text unit candidates for selection, the selection and/or confirmation of a replacement text unit, and the exiting of the text unit replacement mode.

The manner in which the input device 40 is utilized to modify characters will now be discussed. With reference to FIGS. 6-9, an example of a graphical user interface that may be displayed on the display screen 31 as at least a portion of the image 32 is depicted. For purposes of example, the graphical user interface is depicted as a word processing software application that is displayed within a window 33 having a border 34*a*, a taskbar 34*b*, a toolbar 34*c*, and a character processing area 34*d*. Such is conventional during the use of word processing programs such as Microsoft WORD. The border 34*a* defines the boundaries of the window 33 and may be adjustable in size to suit the preferences of the individual. The taskbar 34*b* is horizontally-oriented and positioned adjacent to an upper portion of the border 34*a* to provide a plurality of menus that permit the individual to perform various tasks related to the specific data file represented within the window 33. Furthermore, the toolbar 34*c* is positioned directly below the taskbar 33*b* and provides a series of buttons that also permit the individual to perform various tasks related to the specific data file represented within the window 33.

Figure 6:
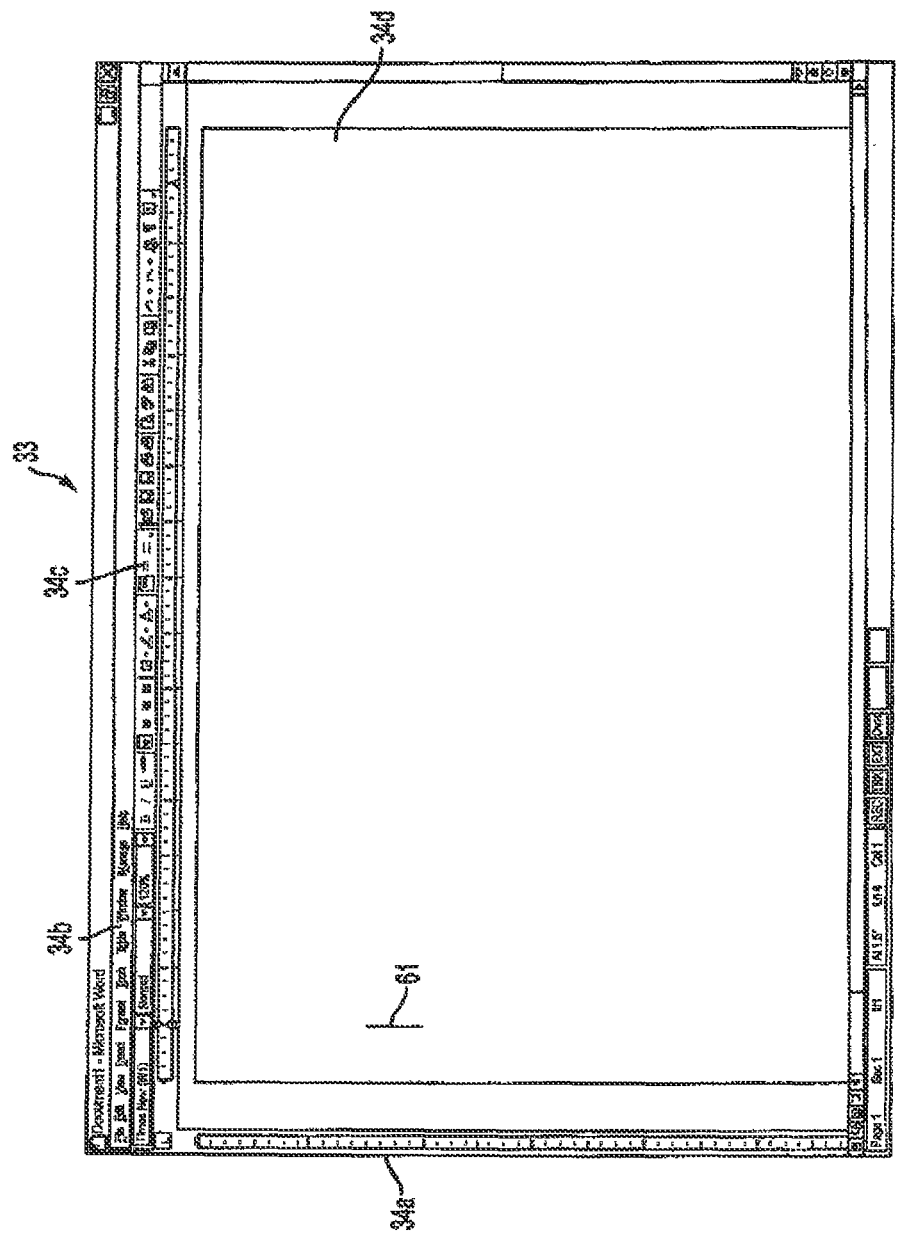
FIG. 6 is a first configuration of a first graphical user interface that may be displayed on the output device.
Figure 7:
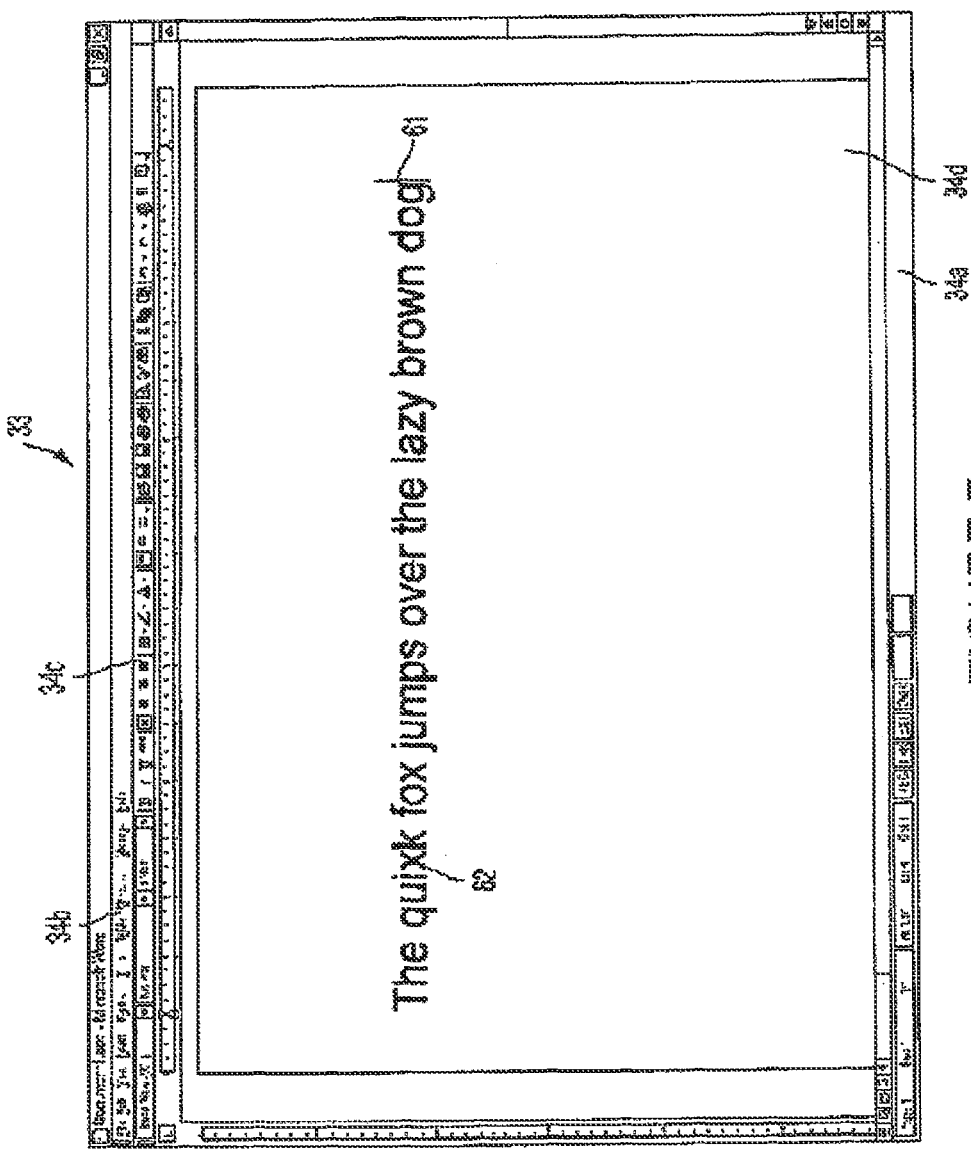
FIG. 7 is a second configuration of the first graphical user interface.

The character processing area 34*d* provides a space for the individual to enter various characters. More particularly, the character processing area 34*d* is a defined area where input from input device 40 is visually rendered. When the window 33 is initially rendered on display screen 31, the character processing area 34*d* may be substantially blank, with the exception of a cursor 61, as depicted in FIG. 6, which shows the individual the position where characters and text units will appear when the characters are input with the input device 40. The width of the character processing area 34*d* is herein defined as the distance on the display covering the typeable area, e.g., from left margin to right margin. Assume for purposes of example that the individual wishes to input the following series of text units: The quick fox jumps over the lazy brown dog. In order to accomplish this task, the individual merely depresses a series of the letter keys 43 that correspond with the characters in the sentence, as is well-known in the art. On occasion however, the individual may inadvertently enter incorrect characters. Accordingly, the individual may inadvertently type the following series of characters: The quixk fox jumps over the lazy brown dog, as depicted in FIG. 7, wherein "quick" is inadvertently entered as "quixk".

The sensor 50 may be utilized by the individual to correct the inadvertently-entered text unit. More specifically, the individual may utilize the sensor 50 to modify a text unit 62 within the character processing area 34d. When entering the series of characters, the individual intended to enter characters that form the word "quick", but inadvertently-entered the text unit 62, which includes an "x" instead of a "c".

Conventional word processing software applications, such as Microsoft WORD, provide a plurality of methods by which the individual may modify the text unit 62 to the intended text unit. As is known in the art, the user may utilize a pointing device to move the cursor 61 adjacent to the text unit 62, highlight a portion of the text unit 62 with the pointing device, and then depress the key 43 that corresponds with the intended character. Alternately, an arrow key may be utilized to move the cursor 61 to the text unit 62, and then a portion of the text unit 62 may be deleted and replaced with the intended character. Furthermore, a spell checking program may be utilized to modify the text unit 62. One limitation upon the spell checking program, however, is that inadvertently-entered characters that form a recognized text unit may not generally be recognized and modified with a spell checking program.

As an alternative to the conventional methods by which the individual may replace the text unit 62 by using the text unit replacement system of the present invention. The text unit system of the present invention includes the text unit editing sensor 50 and supporting input elements that assist in the selection of a text unit to be replaced, the confirmation of a text unit to be replaced, the presentation of alternative choices of replacement text unit candidates for selection, the selection and/or confirmation of a replacement text unit, and the exiting of the text unit replacement mode. These supporting input elements can take various types of input elements and may include keys presently used on the keyboard of other uses, such as arrow keys 43u, 43d, 43r, and/or 43l, and/or may include new or specifically dedicated input elements such as keys 51, 52, and 53 as shown in FIGS. 3-5, key 51 and toggle 55 as shown in FIG. 11, or toggle 56 as shown in FIG. 12.

Specifically, to utilize the text unit replacement system, a text unit, e.g., a word or character, to be replaced is selected. This is performed by making contact with the sensor 50. By contacting the sensor 50, the normal data entry and editing routine within the word processing program is interrupted, and the text unit replacement mode is entered.

The location contacted on the sensor 50 relative to the side-to-side length of the sensor 50 will correspond to the location of the text unit that is intended to be replaced. More specifically, the user will attempt to contact sensor 50 at a position corresponding to the location of the text unit to be corrected relative to the width of the line of text. For example, the text unit "quixk" in FIG. 7 is approximately one-quarter of the distance from a left side of the character processing area 34d to a right side of the character processing area 34d. Accordingly, to select the word "quixk" to be replaced, the user may contact an area on the sensor 50 that is approximately one-quarter of the distance from the left side of the sensor 50 to the right side of the sensor 50, which corresponds with a zone 54 that is depicted in FIG. 5. Alternatively, the sensor 50 is mapped to correspond to the location of the text unit to be corrected relative to the width of the specific line of text, i.e., from the beginning of the line to the end of the line.

Figure 8:
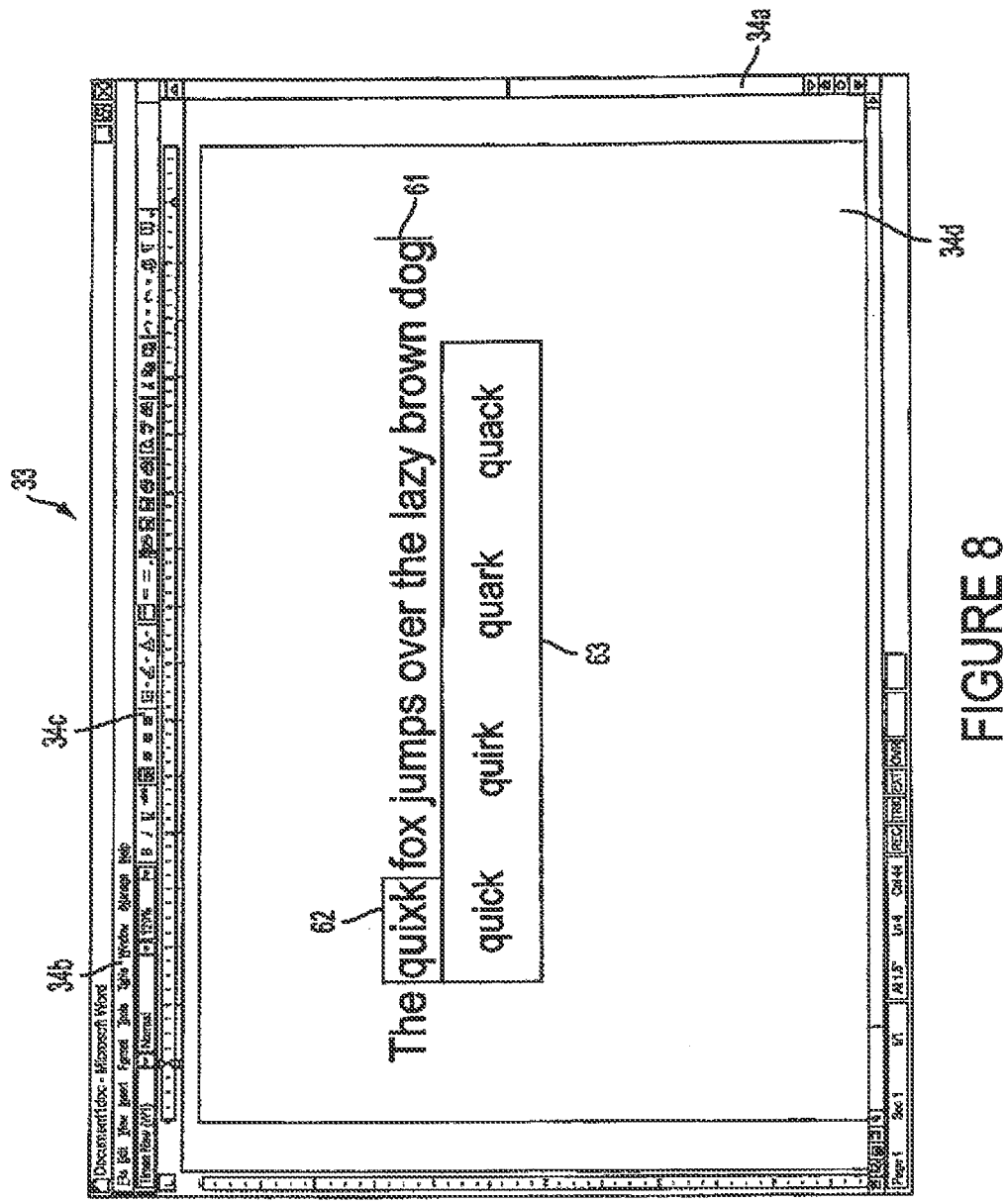
FIG. 8 is a third configuration of the first graphical user interface.

Upon contacting the sensor 50, the initially selected text unit may be graphically accentuated by highlighting or otherwise graphically differentiating the selected text unit from the other text units on the line. The action of making contact with the zone 54 will highlight one or more text units that are approximately one-quarter of the distance from a left side of the character processing area 34d to a right side of the character processing area 34d, as depicted in FIG. 8.

If the initially selected text unit to be replaced is not the desired text unit to be replaced, the user can modify the selection. In an exemplary embodiment, such is performed by the user moving the pointer, e.g., the user's finger, to the left or the right on the sensor, and alternative text unit can be designated to be replaced corresponding to the final contact location on sensor 50. The line containing the text unit to be selected for replacement is designated for default to be the line where the cursor 61 is located. If desired, keys; not shown, may be provided for input to move the line of text to be replaced up or down.

Accordingly, a proportional system is utilized to determine the specific text unit that is selected. As discussed above, the text unit 62 was approximately one-quarter of the distance from a left side of the character processing area 34d to a right side of the character processing area 34d, and the individual contacted an area on the sensor 50 that is approximately one-quarter of the distance from a left side of the sensor 50 to a right side of the sensor 50, which corresponds with a zone 54. Accordingly, the specific text unit that is selected through contact with the sensor 50 may be selected based upon a proportionality between the position of the text unit and the position of contact with the sensor 50. The software application that controls the use of the sensor 50 may also be configured to only select a single text unit, i.e., either a single character or a single word. Accordingly, making contact with the sensor 50 may be utilized to select a single character located on the line of the cursor 61.

Confirmation of the text unit to be replaced is then performed. In a first embodiment, such confirmation is performed by the actuation of an input element separate from sensor 50. For example, such confirmation can be performed by pressing up arrow or down arrow 43u or 43l (FIGS. 4 and/or 10), or by pressing key 51 (FIGS. 5 and/or 10), or by pressing the upper directional portion 57c of toggle 56 (FIG. 12). In alternative embodiments, confirmation may be performed by actuation of the sensor 50 in a predetermined manner such as maintaining contact on the desired location of the sensor 50 for a predetermined period of time or by a subsequent "tap" of the sensor 50 at the same location. Algorithms for controlling the interface regarding sensor 50 to determine when a touch is proper or inadvertent, when a predetermined contact has been met, or when a subsequent tap or double tap has occurred are known in the art and any suitable algorithm may be used.

Upon confirmation of a text unit to be replaced, alternative choices of replacement text unit candidates for selection are graphically presented. Preferably, and as shown in FIG. 8, the potential text unit candidates for selection are presented in a horizontally orientation facilitating the use of the sensor 50 for selection of a replacement text unit. For example, as shown in FIG. 8, a list 63 that includes potential replacement text units, such as "quick", "quirk", "quark", and "quack" is presented in a horizontal orientation immediately below the line of text containing the text unit to be replaced. The replacement candidates can be provided based on a spelling mode wherein alternative word options can be presented based on words having a similar spelling to the word to be replaced, and any desired spelling replacement technique can be used. Alternatively and/or in addition, the replacement candidates can be provided based on a thesaurus mode wherein alternative word options can be presented based on words having a similar meaning to the word to be replaced, and any desired thesaurus replacement technique can be used.

In the event that the user is not satisfied with the replacement candidates offered in the current horizontally oriented graphical display region, he or she may modify the list of candidate replacement text units with the input of additional keys. By pressing a predetermined input element, such as arrow keys 43*l* and 43*r* (FIG. 4), keys 52 and 53 (FIGS. 3-5), left and right regions 55*l* and 55*r* of toggle 55 (FIG. 11), or left and right regions 57*l* and 57*r* of toggle 57 (FIG. 12) and new set of replacement candidate text units is presented. Contacting the left and right keys/regions of these elements will toggle multiple sets of replacement candidate text units until the user locates a desired text unit replacement candidate.

To select the desired text unit for replacement, the user identifies the desired text unit for replacement (i.e., "quick") from the list 63 of potential replacement text units (i.e., "quick", "quirk", "quark", and "quack"). The location contacted on the sensor 50 relative to the side-to-side length of the sensor 50 will correspond to the location of the replacement text unit candidate that is intended to be used to replace the previously selected text unit. More specifically, the user will attempt to contact sensor 50 at a position corresponding to the location of the text unit to be corrected relative to the width of the graphical display of potential text unit replacement candidates. For example, the candidate text unit "quick" in FIG. 8 covers approximately the first quarter of the distance from a left side of the candidate text unit replacement graphic to the right side of the candidate text unit replacement graphic. Accordingly, to select the word "quick" to replace "quixk", the user may contact an area on the sensor 50 that is within the zone spanning approximately 0% to 25% of the distance from the left side of the sensor 50 to the right side of the sensor 50. Upon contacting the sensor 50 in this region, the initially selected replacement text unit candidate may be graphically accentuated by highlighting or otherwise graphically differentiating the selected text unit candidate from the other displayed text unit candidates within the set.

If the initially selected text unit candidate to be replaced is not the desired replacement text unit candidate, the user can modify the selection. In an exemplary embodiment, such is performed by the user moving the pointer, e.g., the user's finger, to the left or the right on the sensor, and an alternative replacement text unit candidate (e.g., "quirk") can be designated corresponding to the final contact location on sensor 50.

Figure 9:
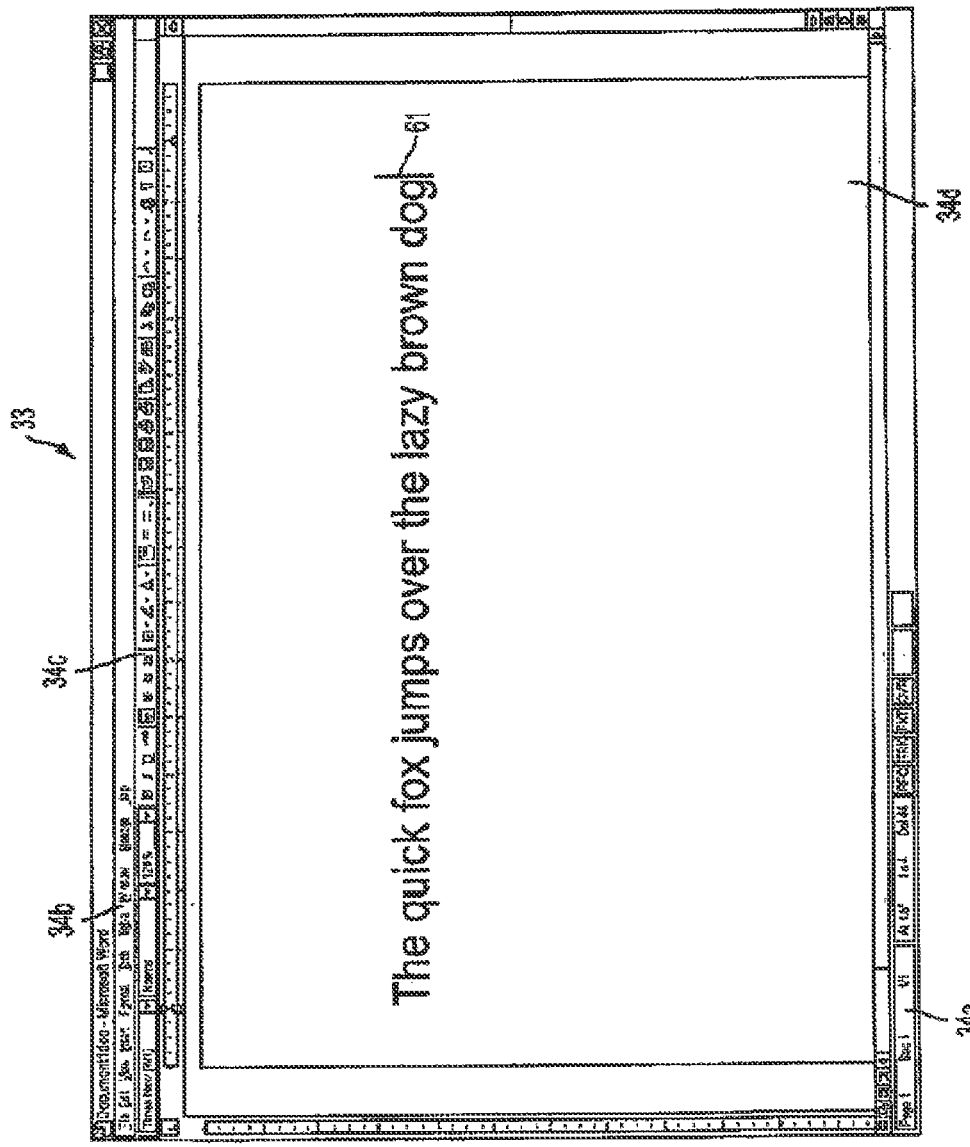
FIG. 9 is a fourth configuration of the first graphical user interface.

Confirmation of the replacement text unit candidate to be used is then performed. In a first embodiment, such confirmation is performed by the actuation of an input element separate from sensor 50. For example, such confirmation can be performed by pressing up arrow or down arrow 43*u* or 43*l* (FIGS. 4 and/or 10), or by pressing key 51 (FIGS. 5 and/or 10), or by pressing the upper directional portion 57*c* of toggle 56 (FIG. 12). In alternative embodiments, confirmation may be performed by actuation of the sensor 50 in a predetermined manner such as maintaining contact on the desired location of the sensor 50 for a predetermined period of time or by a subsequent "tap" of the sensor 50 at the same location. Upon confirmation of the desired replacement text unit to be used, the selected text unit to be replaced (e.g., "quixk") is replaced with the selected replacement text unit candidate (e.g., "quick") both at the data level and graphically, and the result of such is shown in FIG. 9. Upon such confirmation, the text unit replacement mode is exited and the user is then returned to the typical data entry and editing mode as is normally used in the word processing program. Upon this return, the cursor 61 is located at its previous location (e.g., at the end of the string of characters). In this location, the individual may merely continue entering characters when the editing process is complete. An advantage of this feature is that the editing process requires a relatively small degree of distraction when compared with conventional editing processes.

Additionally, one of the supporting keys or an alternative key such as an escape (ESC) key may be used to exit the text unit replacement mode and return to the typical data entry and editing mode prior to the replacement of the text unit if desired.

Based upon the above discussion, the sensor 50 may be utilized to conveniently modify incorrectly-entered characters or text units. The alphanumeric region 45 is generally the most frequently utilized portion of the input device 40, and the hands of the individual are often positioned over the alphanumeric region 45 when utilizing the input device 40. By placing the sensor 50 adjacent to the alphanumeric region 45, the sensor 50 is highly accessible to the individual. Accordingly, the individual may utilize the sensor 50 without having to significantly adjust hand position with respect to the input device 40. For example, at least one hand is generally moved away from the input device 40 to utilize a pointing device to select and modify the text unit 62. Moving a hand away from the input device 40 generally requires that the concentration of the individual change from the input device 40 to the pointing device, thereby interrupting thought processes that are centered around the input device 40. The sensor 50, however, is incorporated into the input device 40 and the use of sensor 50 may be accomplished with less disruption. Furthermore, the use of sensor 50 may be a more expedient manner of modifying the text unit 62 than methods involving the pointing device.

Input device 40 and the sensor 50 may also have application in the context of phonics-based Asian language input. Additionally, the text unit editing system may be used to replace characters as an alternative to replacing words. Referring to FIGS. 13-18, an example of another graphical user interface that may be displayed on the display screen 31 as at least a portion of the image 32 is depicted. For purposes of example, the graphical user interface is depicted as a software application for phonics-based Asian language input. More particularly, the graphical user interface is depicted as a software application for phonics-based Chinese language input that is displayed within a window 33' having a border 34*a*', a taskbar 34*b*', a toolbar 34*c*', and a character processing area 34*d*'. The border 34*a*' defines the boundaries of the window 33' and may be adjustable in size to suit the preferences of the individual. The taskbar 34*b*' is horizontally-oriented and positioned adjacent to an upper portion of the border 34*a*' to provide a plurality of menus that permit the individual to perform various tasks related to the specific data file represented within the window 33'. Furthermore, the toolbar 34c' is positioned directly below the taskbar 34b' and provides a series of buttons that also permit the individual to perform various tasks related to the specific data file represented within the window 34'.

Figure 13:
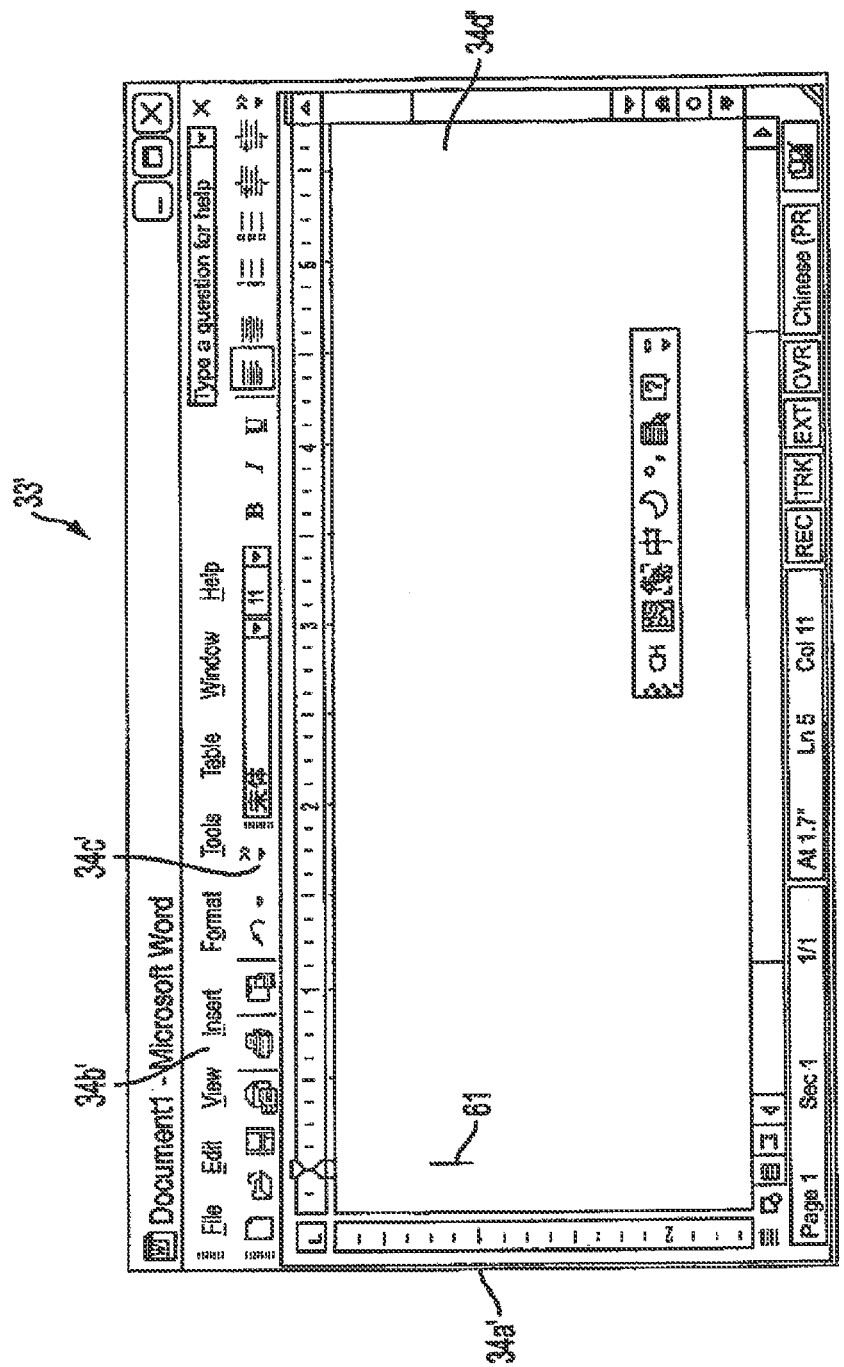
FIG. 13 is a first configuration of a second graphical user interface that may be displayed on the output device.

The character processing area 34d' provides a space for the individual to enter various characters. More particularly, the character processing area 34d' is a defined area where input from input device 40 is visually rendered. When the window 33' is initially rendered on display screen 31, the character processing area 34d' may be substantially blank, with the exception of the cursor 61, as depicted in FIG. 13, which shows the individual the position where characters will appear when the characters are input with the input device 40.

Figure 14:
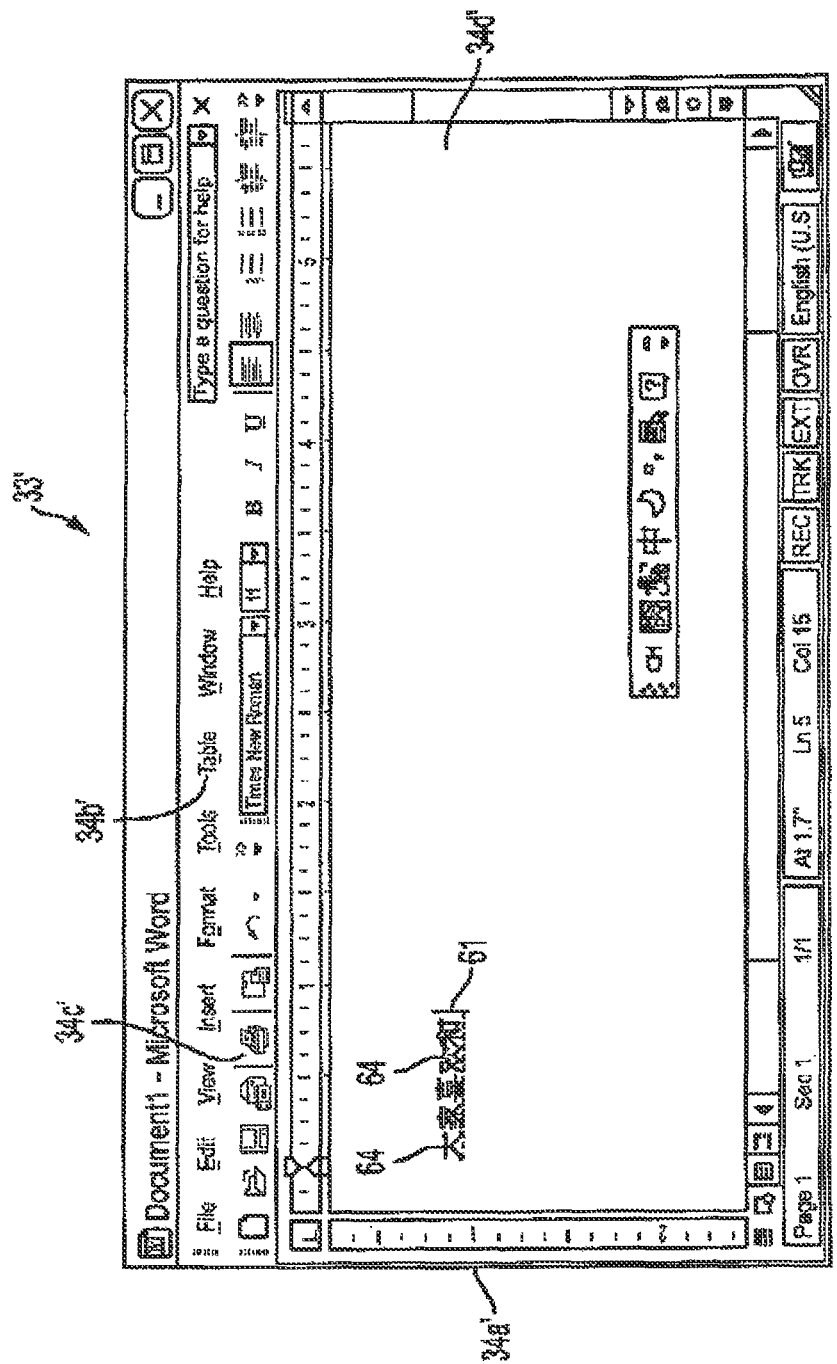
FIG. 14 is a second configuration of the second graphical user interface.
Figure 15:
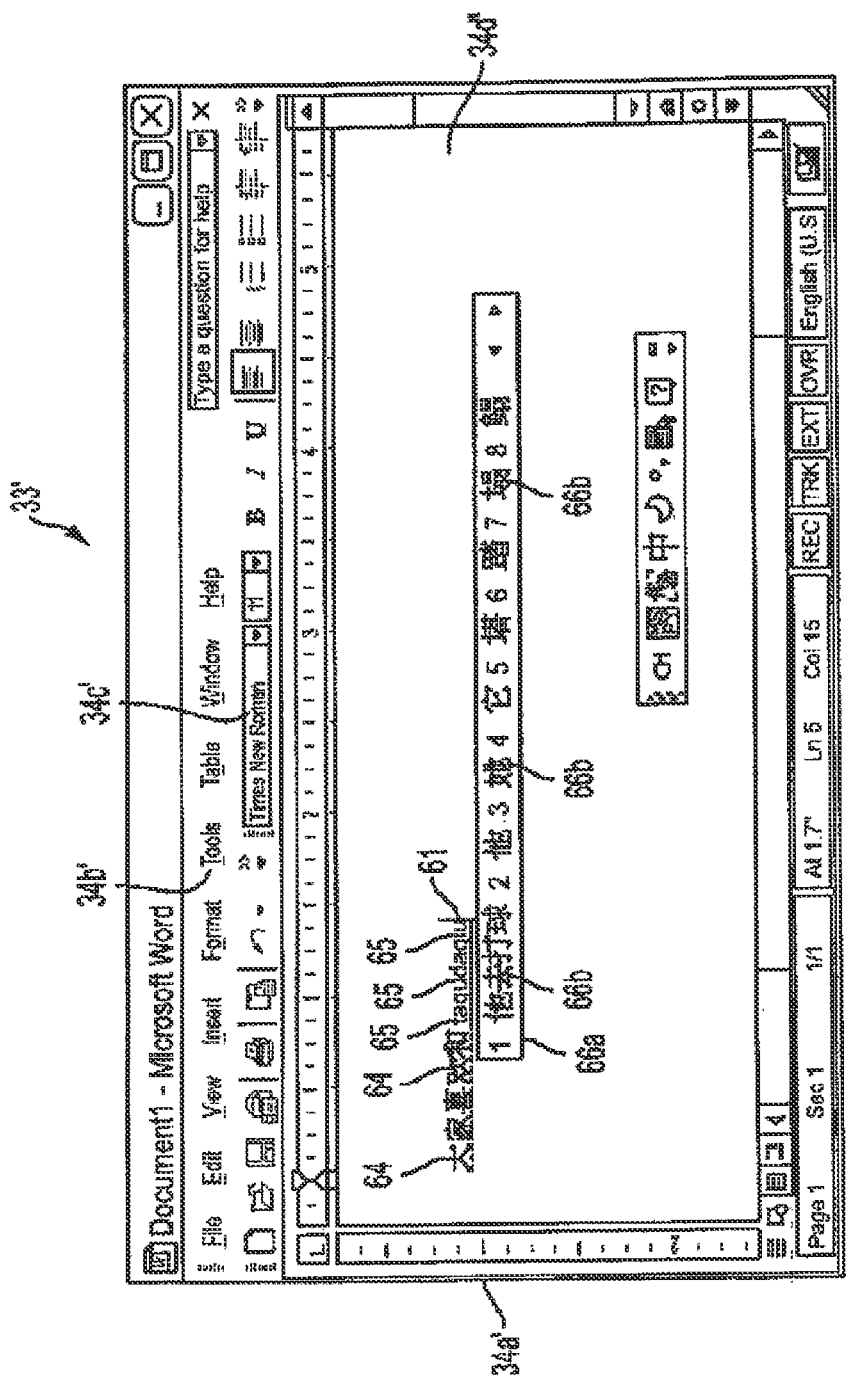
FIG. 15 is a third configuration of the second graphical user interface.
Figure 16:
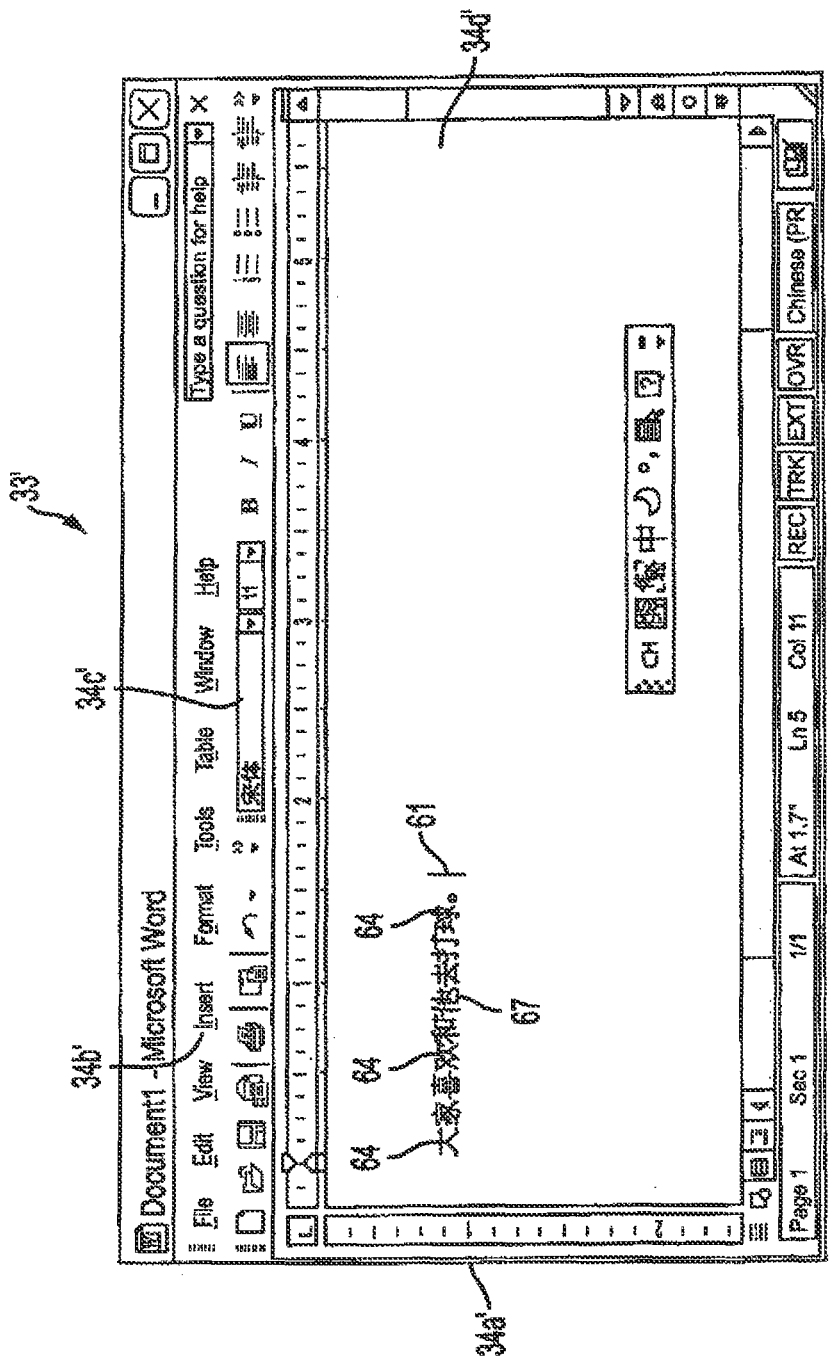
FIG. 16 is a fourth configuration of the second graphical user interface.
Figure 17:
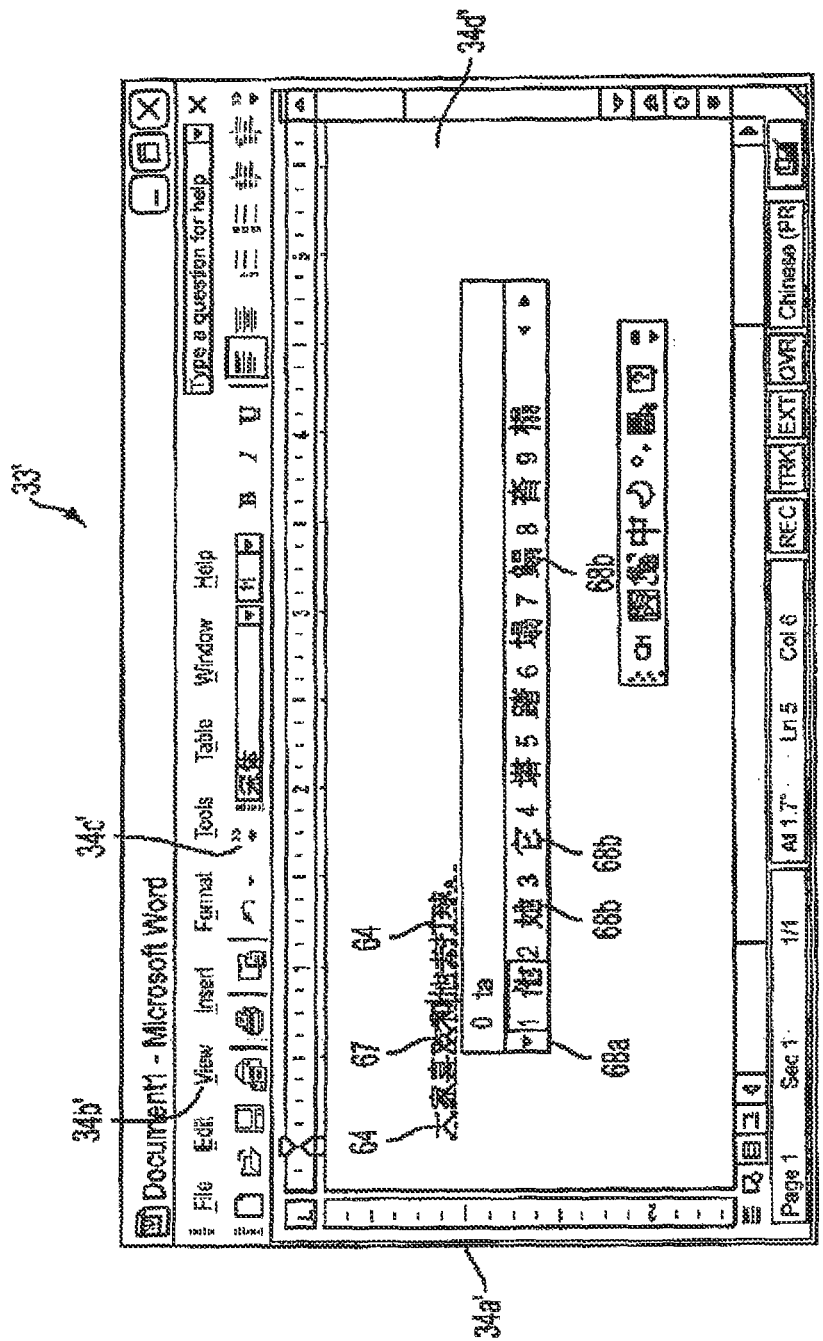
FIG. 17 is a fifth configuration of the second graphical user interface.

In order to enter Chinese characters with phonics-based Asian language input, the individual enters Roman characters and combinations of Roman characters that phonetically represent the intended Chinese character. Accordingly, Roman characters and combinations of Roman characters are entered and are converted to form Chinese characters. More specifically, the software application then processes the Roman characters and converts the Roman characters to a corresponding Chinese character that is phonetically-similar. Accordingly, the individual may enter various Roman characters to display Chinese characters 64, as depicted in FIG. 14. In order to display additional Chinese characters, the individual enters phonetically-similar Roman characters 65, as depicted in FIG. 15. As Roman characters 65 are entered, the software application provides a list 66a having a plurality of potential Chinese characters 66b that may be selected to replace the Roman characters 65. If the individual does not affirmatively select one of potential Chinese characters 66b, the most probable candidate is automatically selected by the software application, as depicted in FIG. 16. Accordingly, the software application displays additional Chinese characters 64 following entry of the Roman characters 65.

Upon inspection of the Chinese characters 64, the individual may determine that an incorrect or undesired Chinese character 67, as depicted in FIG. 16, was utilized. The user may then contact the sensor 50 to enter the text unit replacement mode as described above. As the contacted location of the sensor 50 corresponds to the location of the intended character to be replaced on its line of text, the user will attempt to contact the sensor 50 appropriately. For example, if the character to be replaced is half way form the beginning of the line to the end of the line of text, the user will want to contact the sensor in the center (i.e., midway from the left of the sensor 50 to the right of the sensor). The position on the sensor 50 will designate the character that the user will want to replace and such will be graphically accentuated. If the character initially selected for replacement is not the intended character to be replaced, the user can modify his or her selection as described above, e.g., by moving the pointer along the sensor 50 to the proper location. Once the desired character to be selected has been made, the user can confirm the selection as described above, i.e., by using specific keys 431, 51, or 57c, or by contacting the sensor again in the same location.

Once the character to be replaced has been confirmed, a list 68a of potential replacement Chinese characters 64 is graphically provided horizontally and below the line of the selected character 67 to be replaced. The list 68a includes a set of candidate Chinese characters 68b for replacement. The depicted list 68a includes nine alternate Chinese characters 68b. In many circumstances, the total number of alternate Chinese characters 68b may significantly exceed nine. In order to display the additional alternate Chinese characters 68b, the user may toggle through additional sets of candidates as described above, e.g., by actuating arrow keys 431 and 43r (FIG. 4), keys 52 and 53 (FIGS. 3-5), left and right regions 55l and 55r of toggle 55 (FIG. 11), or left and right regions 57l and 57r of toggle 57 (FIG. 12).

To select one of the alternate Chinese characters 68b, the user contacts an area of the sensor 50 that correspond to a mapped region of the set of displayed candidates. If the initially selected character candidate to be replaced is not the desired replacement character candidate, the user can modify the selection. Such may be performed by the user moving the pointer, e.g., the user's finger, to the left or the right on the sensor. Confirmation of the replacement text unit candidate to be used is then performed. Such confirmation may be performed as described above, e.g., by actuating up arrow or down arrow 43u or 43l (FIGS. 4 and/or 10), or key 51 (FIGS. 5 and/or 10), or the upper directional portion 57c of toggle 56 (FIG. 12). Alternatively, confirmation may be performed by actuation of the sensor 50 in a predetermined manner such as maintaining contact on the desired location of the sensor 50 for a predetermined period of time or by a subsequent "tap" of the sensor 50 at the same location.

Figure 18:
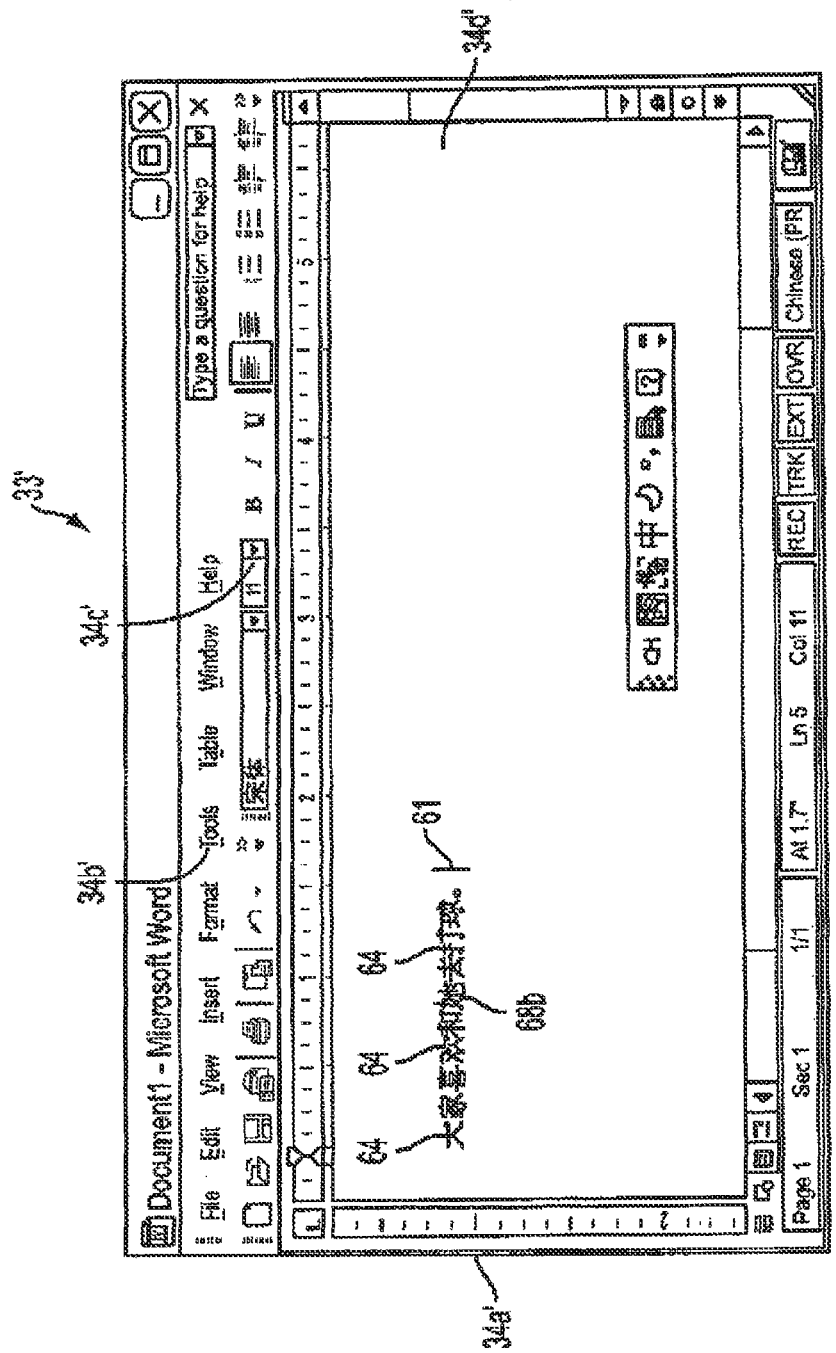
FIG. 18 is a sixth configuration of the second graphical user interface.

Upon confirmation of the desired replacement character 68b to be used, the selected character 67 to be replaced is replaced with the selected replacement character candidate 68b both at the data level and graphically, and the result of such is shown in FIG. 18. Upon such confirmation, the text unit replacement mode is exited and the user is then returned to the typical data entry and editing mode as is normally used in the word processing program. Upon this return, the cursor 61 is located at its previous location (e.g., at the end of the string of characters). In this location, the individual may merely continue entering characters when the editing process is complete. An advantage of this feature is that the editing process requires a relatively small degree of distraction when compared with conventional editing processes.

Alternatively, in either the word-based or the character-based text unit replacement system, the cursor 61 may be moved to (or immediately adjacent to) the text unit to aid in graphically providing visual feedback of the text unit currently selected to be replaced. However, upon confirmation of the text unit candidate for replacement, or upon a premature exiting from the text unit replacement mode, the cursor 61 is returned back to its prior position immediately before entering the text unit replacement mode which is normally at end of the characters to prepare for the entry of additional Roman characters, as depicted in FIG. 18.

As discussed in the Background of the Invention section, the error rate for an average individual utilizing a QWERTY keyboard for phonics-based Asian language input may be approximately 20% or more. Accordingly, the individual may be required to edit one in five of the Chinese characters that are displayed. The sensor 50 provides a convenient and readily-accessible device for efficiently selecting an incorrect Chinese character and modifying the incorrect Chinese character to the intended character.

The above discussions regarding the editing of characters and text units provided situations where the incorrectly-entered text unit is on the same line as the cursor 61. When the individual contacts the sensor 50, text units located on the same line are selected. Utilizing the sensor 50 to edit text units within a single line is one possible use for the sensor 50. In further embodiments of the invention, the sensor 50 may be utilized to select text units that are within a single sentence, even if the sentence is displayed on multiple lines. The sensor 50 may also be utilized to select text units within a single paragraph or within a single document for example. Accordingly, the sensor 50 may be utilized to edit characters and text units regardless of location on the display screen 31.

When the individual makes contact with the sensor 50, the relative position of the contact with respect to the length of the sensor 50 determines the character or text unit that is selected for editing. To assist the individual with determining the relative position of the finger on the sensor 50, various queues may be added to the input device 40. For example, the housing 41 may have markings corresponding with the various zones printed thereon. In addition, tactile queues, such as shallow protrusions, may be embossed or otherwise placed upon the surface of the sensor 50. As the finger contacts the tactile queues, the individual will gain feedback concerning the position of the finger with respect to the sensor 50.

Figure 19:
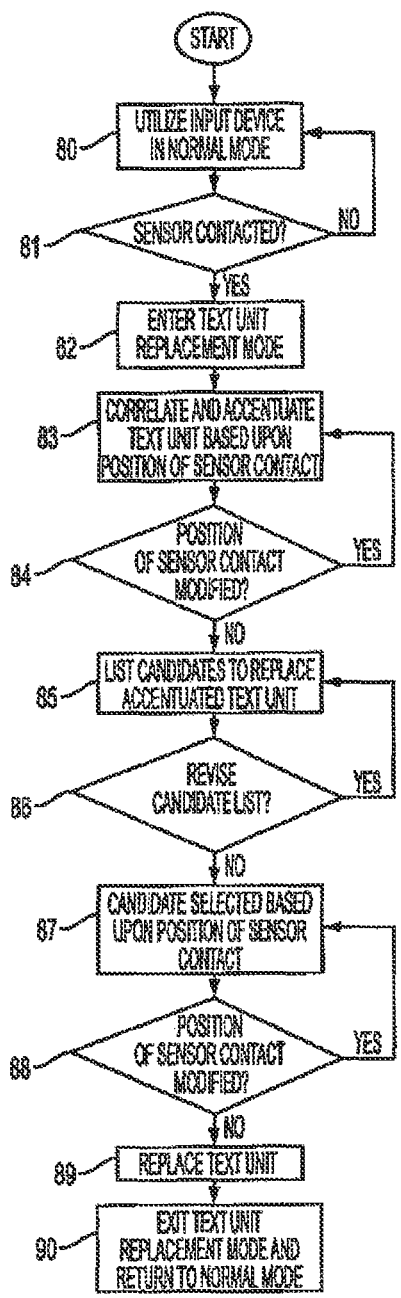
FIG. 19 is a flow diagram illustrating one process of text unit replacement.

Referring to FIG. 19, a flow diagram illustrating the basic process for editing text units is disclosed. Initially, the operating environment 10 is utilized in a normal mode to enter various characters and form text units as is typically done in a word processing software application (step 80). Accordingly, the individual may depress combinations of the keys 43 to display text units on the display screen 31, for example. While operating in the normal mode, the sensor 50 repeatedly detects whether a pointer such as a finger of the user makes contact with the sensor 50 (step 81). If the individual does not make contact with the sensor 50, then the individual continues to operate in the normal mode. If, however, the individual does make contact with the sensor 50, then the operating environment 10 enters the text unit replacement mode (step 82). In the text unit replacement mode, a text unit is selected and accentuated based upon the position of contact with the sensor 50 (step 83). If the position of sensor contact is modified (e.g., if the individual slides the finger relative to the sensor 50), then a different text unit is accentuated based upon the new position of contact with the sensor 50 (step 84). If, however, the position of sensor contact is not modified, as is determined by a confirmation of the selected text unit to be replaced, then various candidates for replacing the accentuated text unit are listed and displayed (step 85). The various listed candidates for replacing the accentuated text unit may reflect the most common replacement candidates. If the desired text unit does not appear within the candidate list, then the candidate list may be revised to list additional candidates (step 86). If, however, the candidate list need not be revised, the individual may select a candidate based upon a position at which contact is made with the sensor 50 (step 87). If the position of sensor contact is modified (e.g., if the individual slides the finger relative to the sensor 50), then a different candidate is selected based upon the new position of contact with the sensor 50 (step 88). If, however, the position of sensor contact is not modified, as is determined by a confirmation of the selected text unit to be replaced, then the text unit is then replaced with the selected text unit candidate (step 89). The application software is then returned to the normal mode (step 90).

The text-based editing system discussed above permits the individual to edit text while drafting a document or otherwise entering text. Accordingly, the individual may proof-read the document while drafting, and make corrections before proceeding to create other portions of the document. The text-based editing system may also be utilized for a plurality of other applications. For example, documents that are scanned with a scanning device are often converted into text documents. Although scan conversion programs are relatively accurate, the conversions may introduce unintended or incorrect text units that must be edited. The text-based editing system discussed above may be utilized, therefore, to edit scanned documents. Furthermore, the text-based editing system may be utilized to edit documents created with voice-recognition software or documents that are translated. With regard to translation, the translation software may select a text unit that is a synonym of the intended text unit, but not the most proper text unit for the context. Accordingly, the text-based editing system may be utilized to replace text units with synonyms.

Figure 20:
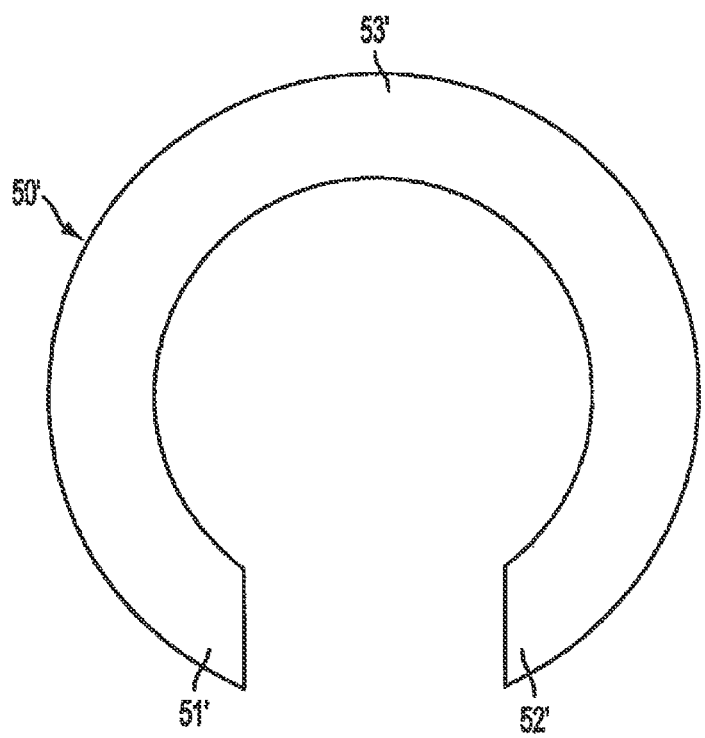
FIG. 20 is a top plan view of a sensor.

In the above material, the sensor 50 is described as having an elongate configuration and being laterally-oriented with respect to the input device 40. In one aspect of the invention, the sensor 50 may have a linear configuration. In a further aspect of the invention, however, the sensor 50 may be curved or may otherwise have a non-linear configuration, yet remain elongate and laterally-oriented. Referring to FIG. 20 a sensor 50' is depicted. The sensor 50' has a generally curved configuration with a first end 51' and a second end 52'. By making contact with the sensor 50' adjacent to the first end 51', text units generally positioned on the left side of the display screen 31 may be selected. Similarly, by making contact with the sensor 50' adjacent to the second end 52', text units generally positioned on the right side of the display screen 31 may be selected. Furthermore, by making contact with the sensor 50' in a central area 53', text units generally positioned in a central area of the display screen 31 may be selected. Accordingly, the various sensor configurations within the scope of the present invention may exhibit a non-linear configuration.

Figure 21A:
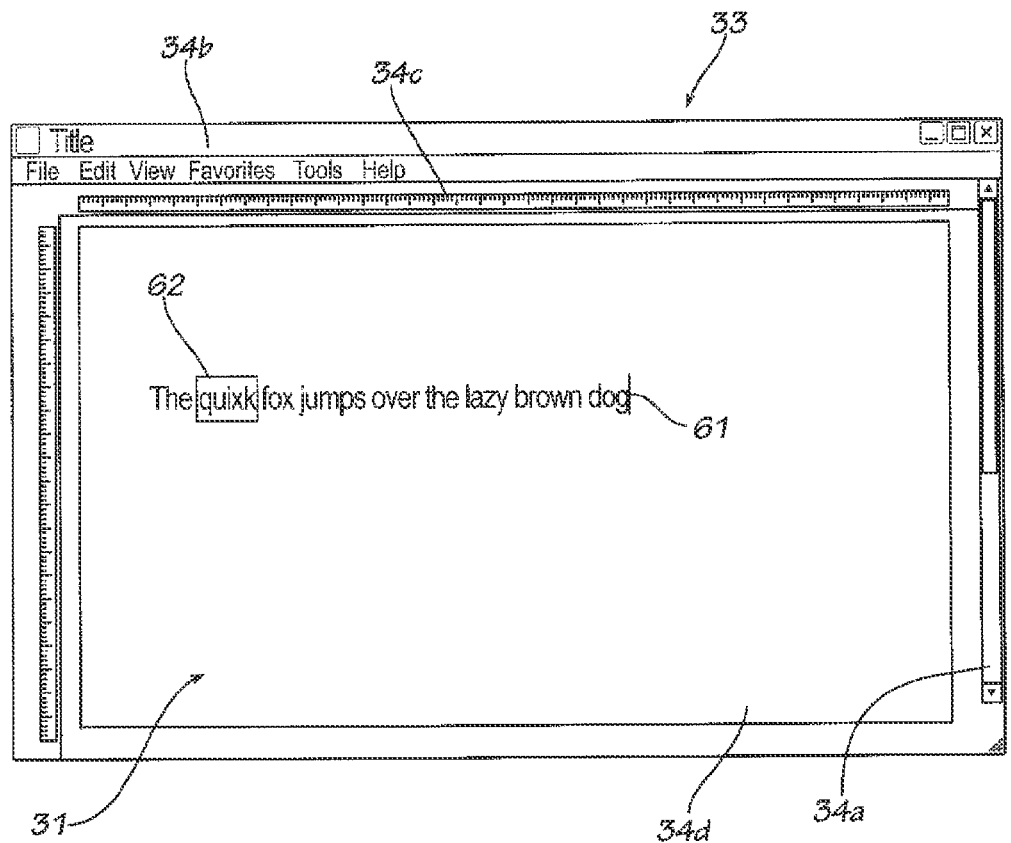
FIG. 21A shows another configuration of a graphical user interface according to aspects of the invention.
Figure 21B:
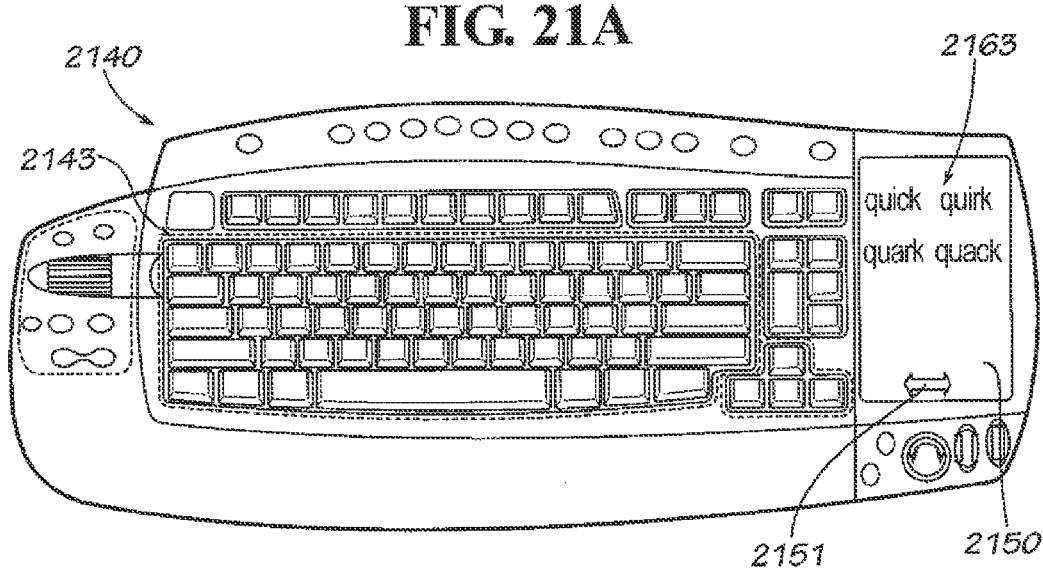
FIG. 21B shows a configuration of an integrated input/output device that illustrates aspects of the present invention.

Referring now to FIGS. 21A and 21B, an input device is shown in the form of input/output device 2140 for providing text-based editing according to further embodiments of the invention. Input/output device is a single, integrated device that provides both input device functionality and output device functionality. As such, input/output device 2140 generally includes the same aspects and features as input device 40 with respect to its input device capabilities for providing character inputs to host computer 20, except as pertaining to its sensor 2150. As discussed further below, sensor 2150 includes an input-sensitive display device 2150 that is configured to display text units or character units and to sense user selection of such units.

In addition to providing input functionality, device 2140 also acts as a supplemental output device along with primary monitor 30 shown in FIG. 3. As is known in the art for dual monitor computer systems and as indicated in FIG. 1, host computer may be operatively connected to a plurality of output devices 30. For instance, host computer 20 may include a second video display interface and driver (not shown) for providing secondary display outputs to device 2140 shown in FIG. 21B along with outputs to the primary monitor. However, rather than simply providing a secondary output device, input/output device 2140 shown in FIG. 21B provides the combined functionality of a keyboard type input device and an input-sensitive display screen, such as a touch-sensitive screen. Thus, input/output device 2140 provides character inputs via keys 2143, supplemental display outputs via display device 2150, and display inputs via user selection of data displayed on display device 2150.

In general, display device 2150 is an input-sensitive display device that provides display functionality and permits various input modals depending upon the configuration, such as touch inputs, stylus inputs, gestures, handwriting inputs, 3-D gesture inputs, etc. For instance, input-sensitive display device 2150 may be a flat panel display formed from a liquid crystal display (LCD), an organic light emitting diode display (OLED), a field emission display (FED), an electronic ink (e-ink) display, or a multi-touch sensing display surface providing 3-D gesture inputs using vision technology, etc. Further, input-sensitive display device 2150 may include a touch-sensitive display, a proximity-sensitive display, a resistance-sensitive display, a digitizer-sensitive display, or an optical-sensitive display, etc.

As illustrated in FIGS. 21A and 21B, input/output device 2140 permits the user to perform input correction via direct interaction with candidate text units 2163 shown on display device 2150. The error correction methods discussed above are generally applicable for use with input/output device 2140, except that input/output device 2140 permits the user to directly select a desired text unit, such as by touching the correct text unit of text units 2163 shown on display device 2150. As such, error corrections methods are enhanced via direct user contact with the correct text units, while the possibility of mistakes are reduced due to direct user selection of the desired text unit.

In the example word processing configuration illustrated in FIGS. 21A and 21B, the operating environment 10 is utilized in a normal mode to enter various characters and to form text units shown in display 31 as is typically done via a word processing software application. Accordingly, the user may depress combinations of keys 2143 to display text units on the display screen 31, for example. In one embodiment, the operating environment executing the word processing application may continually identify potential errors related to the current position of the cursor, for which it may continually display updated text unit correction options 2163 on the input-sensitive display device 2150. In another embodiment, while operating in the normal mode, the input-sensitive display device 2150 may repeatedly detect whether a pointer, such as a finger of the user, makes contact with the input-sensitive display device. If the individual does not make contact with the display device 2150, then the operating environment continues to operate in the normal mode.

If, however, the individual does make contact with the input-sensitive display device 2150, then the operating environment 10 enters a text unit replacement mode and provides text unit correction options 2163 on the display device 2150. In the text unit replacement mode, a text unit is selected and accentuated based upon direct user selection of the desired text unit. The various listed candidates 2163 for replacing the accentuated text unit may reflect the most common replacement candidates. If the desired text unit does not appear within the candidate list, then the candidate list may be revised to list additional candidates via user selection of next/back options 2151 of the display device. Once the user selects a replacement text unit, then the selected text unit replaces the selected text unit candidate and the application software is returned to its normal mode.

Figure 22:
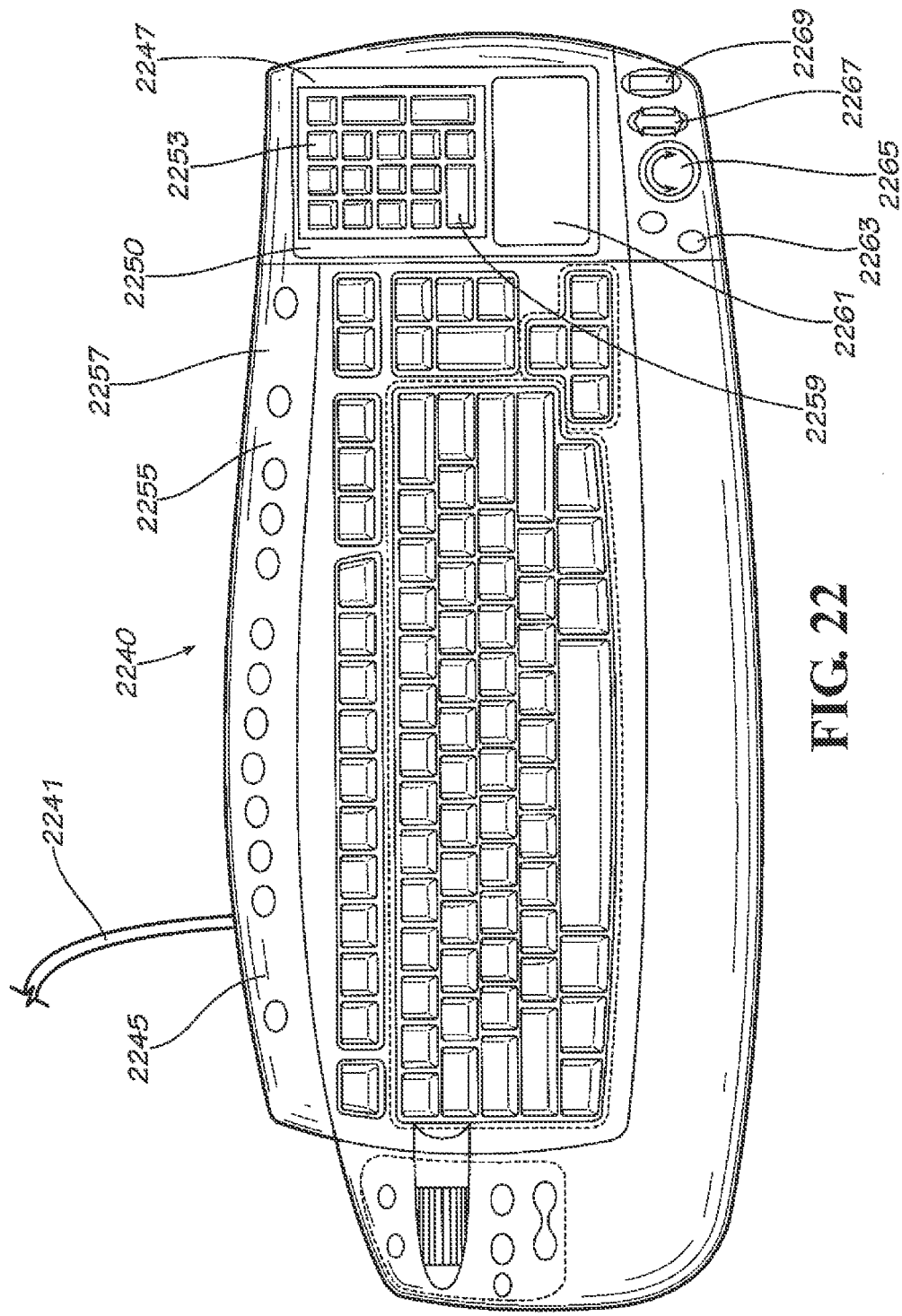
FIG. 22 shows another configuration of an integrated input/output device that illustrates further aspects of the present invention.

Referring now to FIG. 22, an input/output device 2240 is shown according to further embodiments of the invention. Device 2240 generally includes the aspects and features of device 2140, except as pertaining to user-configurability of the display device 2250. As shown, input-sensitive display device 2250 may show virtual input options 2253, such as images of controls, buttons, soft keys, etc. In the example shown in FIG. 22, input options 2253 represent numeric keypad buttons found on conventional keyboards. As such, the user may select the virtual keypad buttons shown on display device 2250 to perform the related functionality, such as to enter the number corresponding to a selected keypad button. Numerous input configurations and controls, however, may be shown on display device 2250 as desired.

In one configuration, input/output device 2240 may be pre-programmed to display one of several pre-set input configurations from which the user may select. In another embodiment, software (not shown) resident on the host computer may be used to configure the virtual inputs shown on display device 2250. In a further embodiment, input/output device 2240 may include a processor 2255 and memory 2257 that cooperate to permit the user to personally configure and/or program the functionality of the virtual inputs options 2253 shown on the display device. As such, configuration instructions may be stored in memory 2257, which provide instructions to processor 2255 to permit the user to interact with input-sensitive display device 2250 and thereby configure the display to show desired controls, buttons and other input options.

The instructions stored in memory 2257 may further permit the user to create specialized commands, routines, and macros, etc. that correspond to a control represented on the display. For example, the user may create a virtual hotkey button (not shown) to be shown on the display, which, when selected, causes a particular application to launch (e.g., a browser application) or that generates a particular command (e.g., places the computer system in a sleep mode).

As further shown in FIG. 22, display device 2250 may be divided into various operational regions 2259 and 2261. Region 2259 may be reserved as a combination display/input region for displaying and selecting characters (e.g., virtual input options 2253), whereas region 2261 may be configured as a non-display input region to receive directional inputs, such as mouse-type directional inputs, cursor control inputs, scrolling inputs, etc., which are conventionally provided via touch pads. Additionally, discrete input controls may be provided proximate the input-sensitive display device 2250 to enhance user interaction therewith. For instance, selection buttons 2263 may be provided, as well as a rotary disk 2265, toggle switches 2267, and roller wheel 2269, which can provide specific functionality to the display device and/or may be configured by the user as desired to provide custom functionality to the display device. For instance, rotary disk 2265 may provide default rotation functionality to images displayed on the display device, or it may be custom configured by the user to switch between particular displays. For instance, rotary disk 2265 may be custom-configured by the user to switch between various configurations of virtual inputs 2253 like a scientific calculator arrangement and a conventional calculator arrangement. Similarly, roller wheel 2269 may be a conventional scroll wheel that provides movement input instructions for displays on display device 2250. Likewise, toggle switches 2267 may provide default functionality, such as switching between virtual displays on the display device, or it may be configurable for custom functionality.

In an integrated keyboard/input-sensitive display device, such as device 2240 shown in FIG. 22, a substantially full-sized keyboard 2245 is coupled with the input-sensitive display device 2250. In such a configuration, a display screen 2247 of the input-sensitive display may be a flat panel display screen having a width of about 4 inches to 10 inches. Such a range of sizes permits the input/output display device 2250 to have a flexible range of options and display configurations to effectively assist the user with interacting with the computing environment. More particularly, display screen 2247 preferably has a display screen width of 7.8 to 8.5 inches, which generally matches the width of conventional paper, and more preferably has a display screen width of 8.0 to 8.3 inches to accommodate 8.5.times.11 inch paper and A4 size paper (210 mm width). Nonetheless, these sizes are not unduly large as to prevent the display screen from becoming overwhelmingly large with respect to the substantially full-sized keyboard 2245.

Input/output device 2240 may include a single interface 2241 with the host computer 20, such as a wired or a wireless connection. For instance, interface 2241 may include a universal serial bus (USB) interface, a FIREWIRE interface, a home audio video interoperability (HAVI) interface, or other types of interfaces. Further, interface 2241 may include a wireless BLUETOOTH interface, a wireless personal area network (WPAN) interface, a wireless local area network (WLAN) interface, a wireless fidelity network (WiFi) interface, a cellular interface, an infrared interface, or other type of wireless interface. In addition, interface 2241 may include a plurality of interfaces, such as a first interface for the keyboard 2245, an output interface from the host computer to the display device 2250, and/or an input interface for transmitting to the host computer user-selected display inputs from display device 2250.

Figure 23:
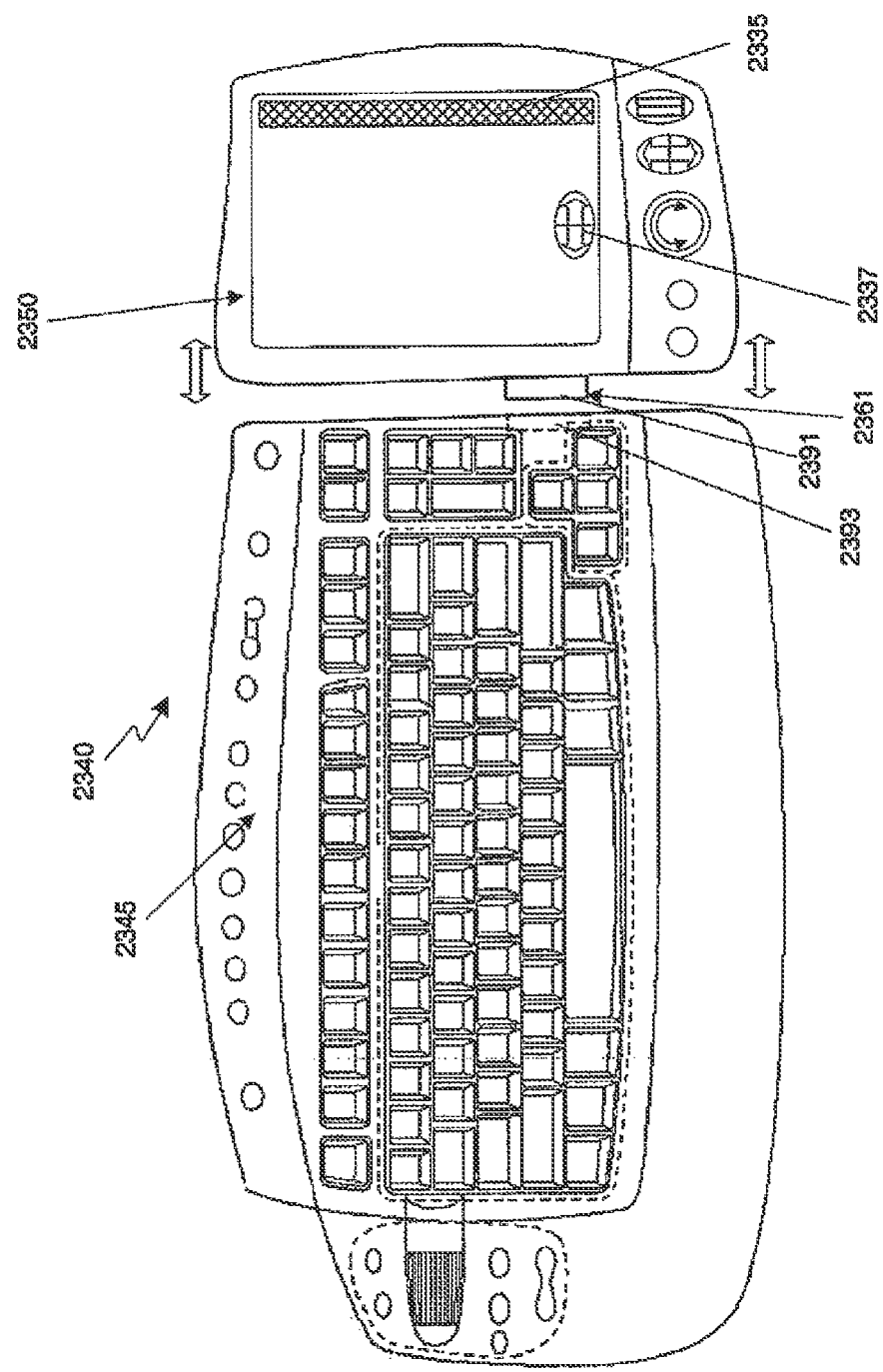
FIG. 23 shows a further configuration of an integrated input/output device that illustrates further aspects of the present invention.

FIG. 23 illustrates an example input/output device 2340 that generally includes the aspects and features of device 2240, except as pertaining to the detachability of the input-sensitive display device 2350. As shown, input-sensitive display device 2350 includes a keyboard interface 2361, such as a USB connection, for operatively connecting the device with keyboard 2345. The keyboard interface 2361 is a schematic representation of an interface between keyboard 2245 and display device 2250, which may include a first part of a USB connection 2391 and a second part of a USB connection 2393. Such a connection permits the display device 2350 to quickly connect with the keyboard and, thereby, to connect quickly with the host computer to which the keyboard is connected. Alternatively, display device 2350 may independently connect with the host computer and, thus, simply be placed proximate the keyboard to facilitate their collective use. FIG. 23 also shows a virtual slider 2335 displayed on input-sensitive display device 2350, which can permit the user to scroll content shown on the display device. FIG. 23 further shows a virtual page turning control 2337, which can permit the user to turn pages shown on the display device.

Figure 24:
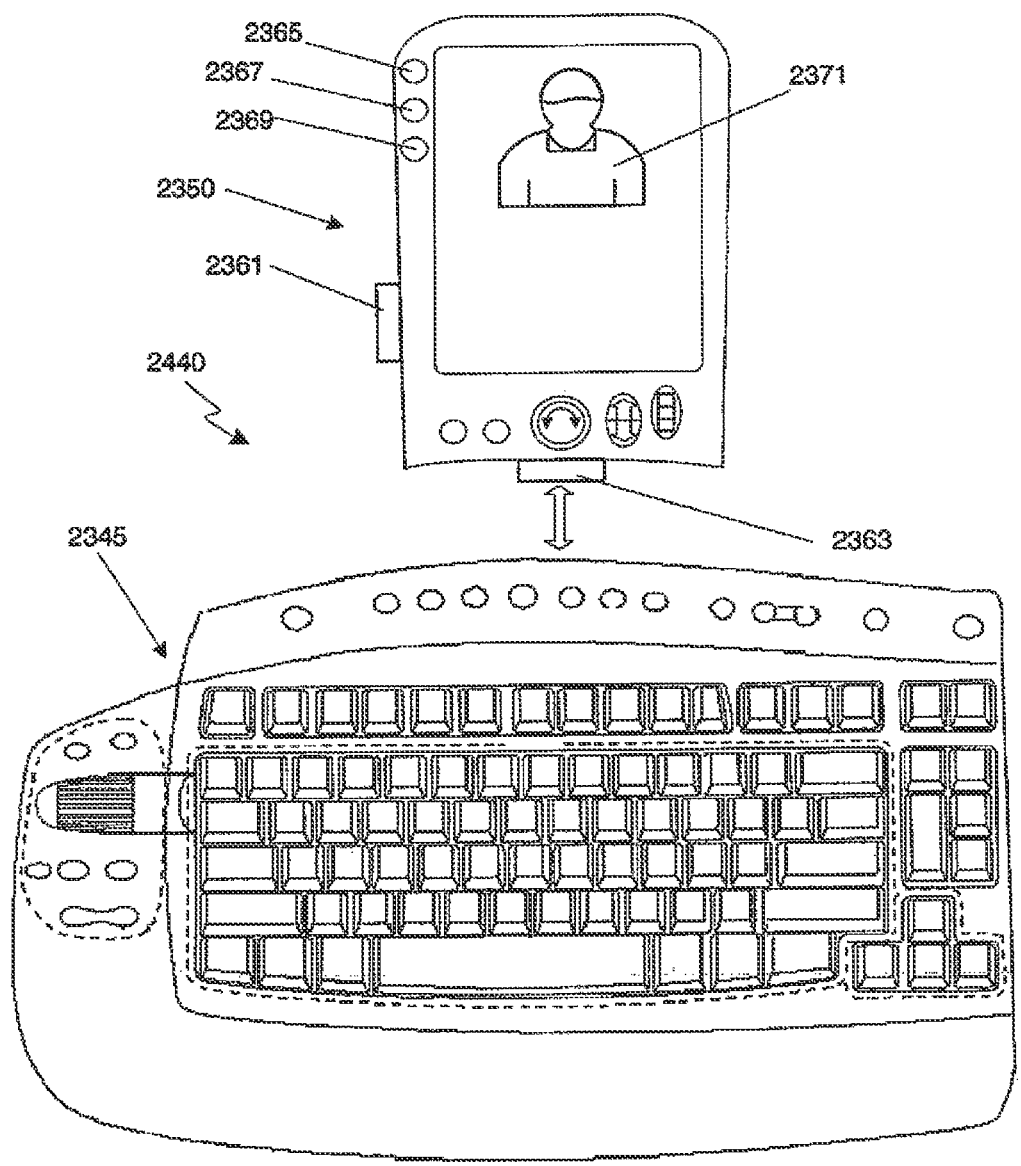
FIG. 24 shows yet another configuration of an integrated input/output device that illustrates further aspects of the present invention.

FIG. 24 illustrates another example input/output device 2440 that generally includes the aspects and features of device 2340, except that it includes a second keyboard interface 2363 and it provides additional functionality. The second keyboard interface permits the input-sensitive display device 2350 to be placed in a lateral configuration as shown in FIG. 23, or in a vertical configuration as shown in FIG. 24 according to the user's preference. The second keyboard interface 2362 is represented schematically as an interface between the keyboard and the display device, which may include a first part of USB connection (not shown) on the keyboard and a second part on the display device, similar to parts 2391 and 2393 of FIG. 23. Further, it is understood that either or both of interfaces 2361 and 2363 may be wireless connections between the keyboard and the display device, such as a BLUETOOTH connection. In alternate configurations, the display device and the keyboard may independently communicate with host computer 20 to provide the described functionality. The lateral configuration of FIG. 23 may be advantageous for providing inputs to the display device, such as touch, stylus or 2D gesturing inputs, whereas the vertical configuration may be advantageous for permitting multi-monitor or mini-monitor uses of display device 2350. For instance, the computing environment may be configured to provide supplemental information to input-sensitive display device 2350 for use as a secondary monitor or a mini-monitor. In one example, host computer 20 may be configured to provide text messaging information on display device 2350 rather than on the primary monitor 30. Of course, a wide variety of data types and application examples may take advantage of a secondary, mini-monitor. In the vertical configuration shown, display device 2350 may include angular adjustments to orient the display at a desired orientation.

The vertical configuration shown in FIG. 24 may also be beneficial for facilitating multi-modal inputs to the input-sensitive display device 2350, such as hand gestures, speech or vision inputs. For example, input-sensitive display device 2350 may include a multi-touch sensing display surface, such as the multi-touch control surface provided by the JAZZ MUTANT company of Pessac, France, which can sense various 2D and 3D gesture inputs. Further, input-sensitive display device 2350 may further include an image sensor or a video sensor 2365, a microphone 2367, and a speaker 2369, which may further enhance user interaction with the display device in the vertical configuration. In the example of FIG. 24, input-sensitive display device 2350 is providing video camera functionality and displaying a video image 2371 received by host computer 20.

Figure 25A:
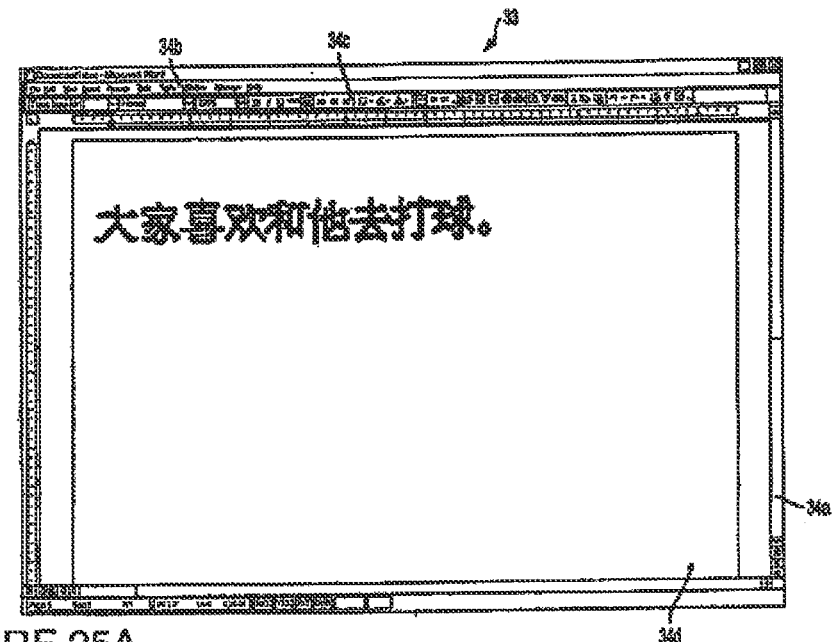
FIG. 25A shows a further configuration of a graphical user interface according to aspects of the invention.
Figure 25B:
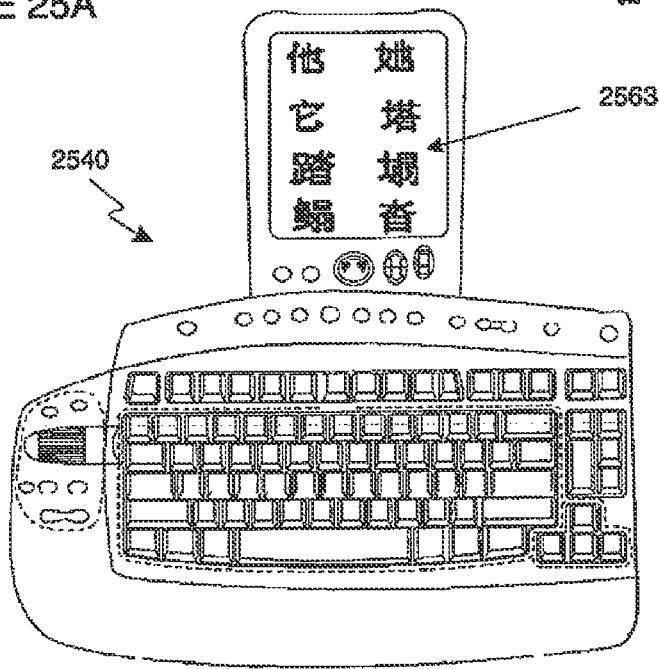
FIG. 25B shows an additional configuration of an integrated input/output device that illustrates aspects of the present invention.

FIGS. 25A and 25B further example input/output device 2540 that generally includes the aspects and features of device 2440 in the vertical configuration. In addition, the example shown further illustrates use of the input/output device 2540 for performing error correction methods, such as the methods discussed along with FIGS. 21A and 21B, as well as FIGS. 6-9 and 13-19. As noted for FIGS. 21A and 21B, direct interaction with text correction options 2563 can facilitate and simplify user correction of information in a document. The vertical configuration shown in FIGS. 25A and 25B may be particularly advantageous for viewing and interacting with large number of correction options that may be provided when a user interacts with Asian languages and various character options related thereto.

Figure 26:
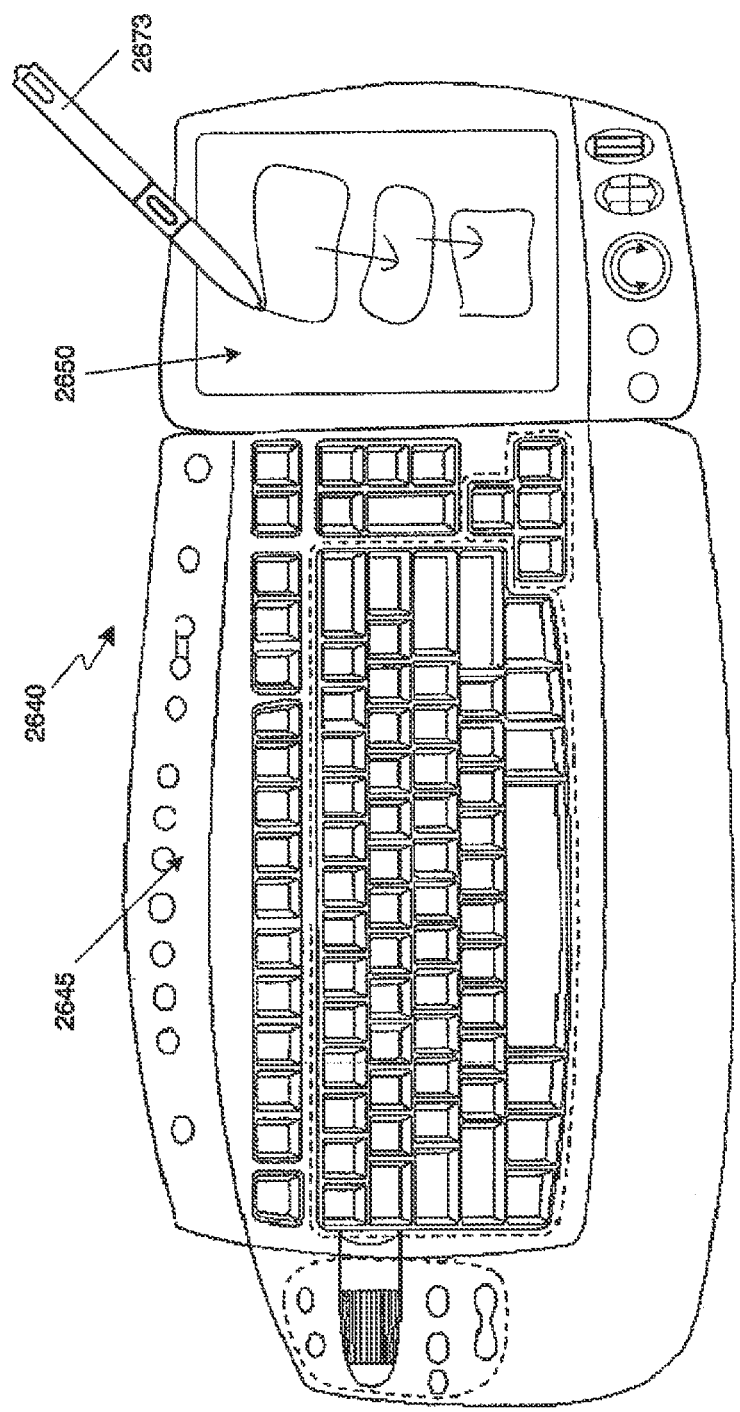
FIG. 26 shows a further configuration of an integrated input/output device that illustrates further aspects of the present invention.

FIG. 26 shows a further example input/output device 2640 that generally includes the aspects and features of device 2340, as well as being configured to interact with a stylus 2673. Via use of stylus 2673, a user can select, highlight, and/or write on the digitizing input-sensitive display device 2650. Examples of suitable digitizing stylus devices 2673 include electromagnetic pen digitizers, such as MUTOH or WACOM pen digitizers. Other types of pen digitizers, e.g., optical digitizers, may also be used. Input-sensitive display device 2650 and/or host computer 20 operatively connected therewith interpret gestures made using stylus 2673 in order to manipulate data, enter text, create drawings, and/or execute conventional computer application tasks such as spreadsheets, word processing programs, and the like.

The stylus 2673 may be equipped with one or more buttons or other features to augment its selection capabilities. In one embodiment, the stylus 2673 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 2673 and used for selecting or indicating portions of the displayed image on input-sensitive display device 2650.

In various embodiments, the computing system 10 provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the Net programming model from Microsoft Corporation.

Figure 27:
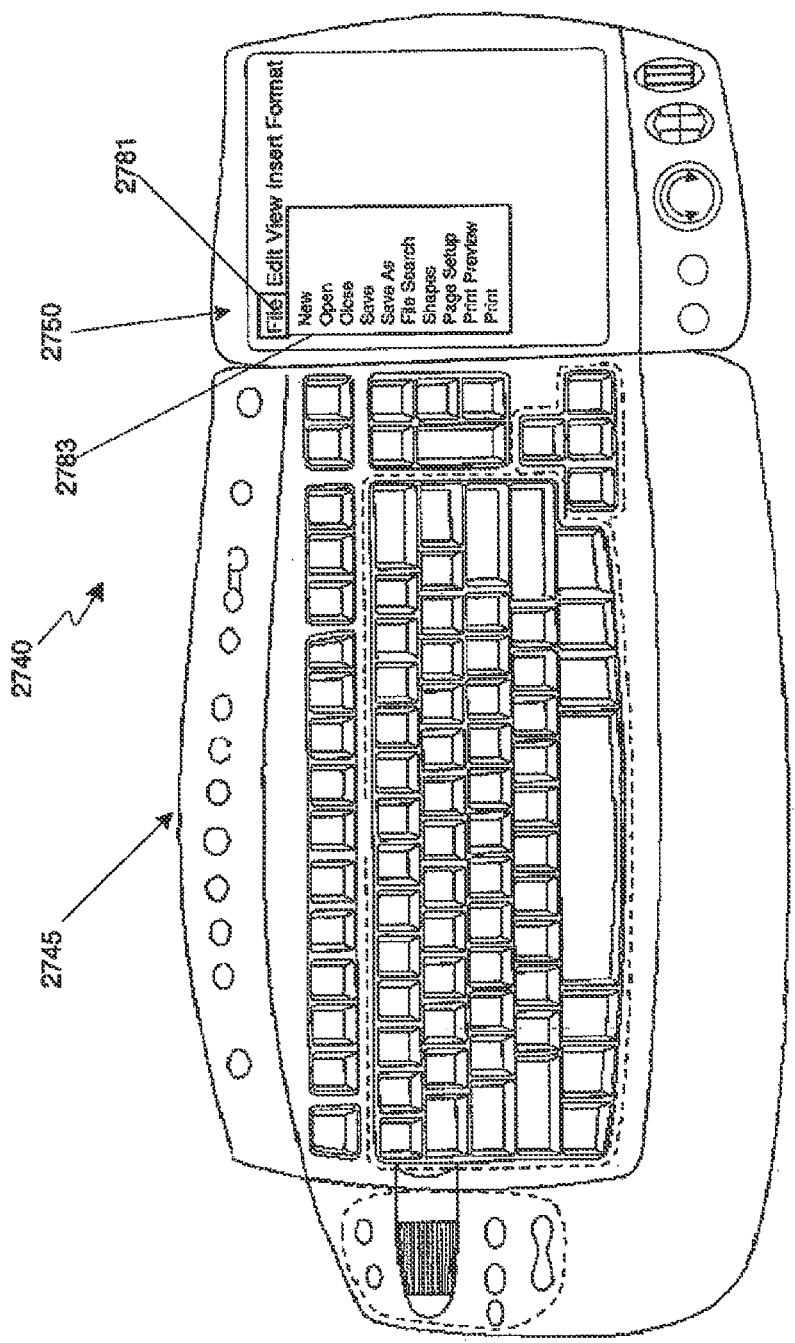
FIG. 27 shows yet another configuration of an integrated input/output device that illustrates further aspects of the present invention.

FIG. 27 shows a further example input/output device 2740 that generally includes the aspects and features of device 2340, as well as being configured to provide menus 2781 and menu options 2783 on the input-sensitive display device 2750 for an application being processed by computer 20 and shown on primary monitor 30. As illustrated, input-sensitive display device 2750 can improve user interaction with graphical interface items, such as menus, by displaying such items on the input-sensitive display device 2750. Such a display places the user interface items in close proximity to the user's fingers while the user is entering data on keyboard 2745, which improves the user's ability to select a menu item without needing to reach for a mouse or another input device. In one configuration, the menus may be provided automatically while the user is working with a particular application. In another configuration, the user may select a particular hot key on keyboard 2745 to cause menu 2791 to be displayed. In a further configuration, the user may interact with input-sensitive display device 2750 to request the menu display.

Figure 28:
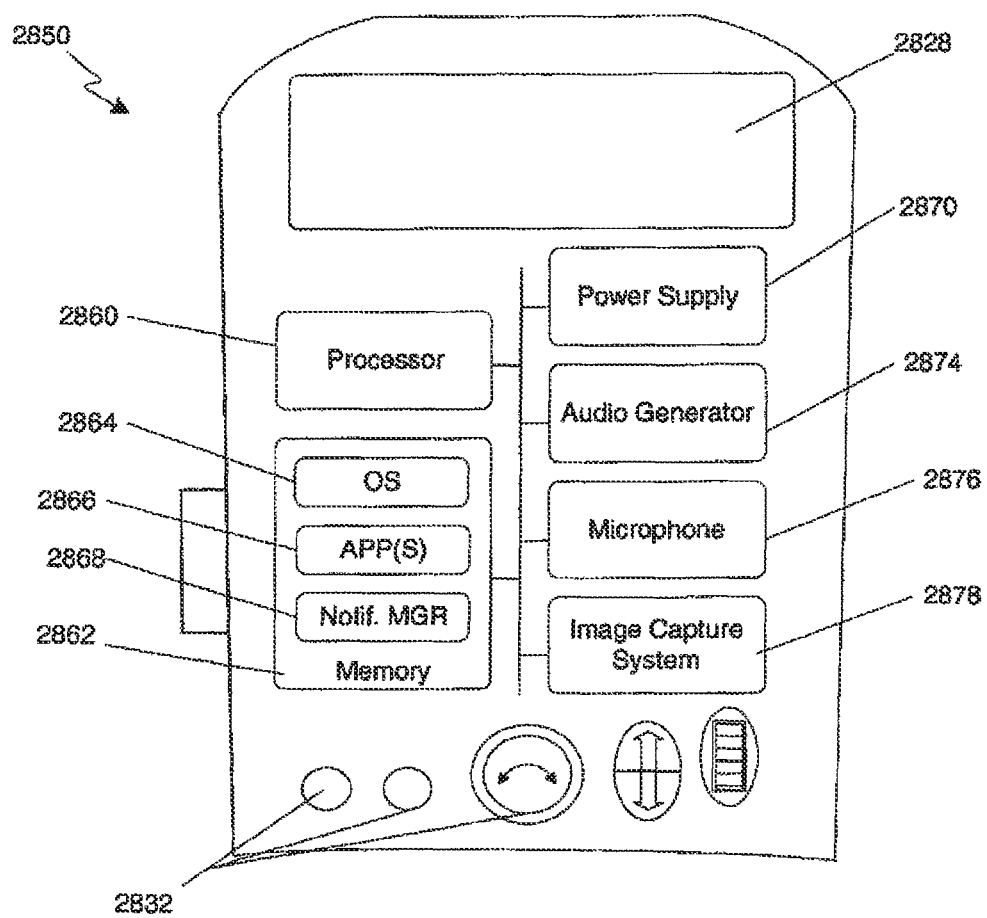
FIG. 28 shows functional components of an example configuration of an input-sensitive display device for use with illustrating aspects of the present invention.

FIG. 28 shows functional components of an example configuration of an input-sensitive display device 2850, which may be used with previously-discussed embodiments and configurations. In addition, as shown, display device 2850 may include functional components to permit it to operate separately from host computer and/or other input devices. However, it may also be configured only for operation with the host computer and/or an input device. In the stand-alone configurations, display device 2850 may mate with a host computer, a keyboard, or another device to provide the functionality discussed above, and may provide stand-alone functionality to operate as a personal digital assistant, a mobile terminal device, a cellular telephone, and a remote control device, etc.

As shown, the display device may include a processor 2860, a memory 2862, a display 2828, and input mechanisms/keys 2832. The memory 2862 generally includes both volatile memory (e.g., RAM) and non-volatile memory (e.g., ROM, PCMCIA cards, etc.). An operating system 2864 is resident in the memory 2862 and executes on the processor 2860, such as the Windows® CE operating system from Microsoft Corporation or another operating system.

One or more application programs 2866 are loaded into memory 2862 and run on the operating system 2864. Examples of applications include email programs, scheduling programs, PIM (personal information management) programs, word processing programs, spreadsheet programs, Internet browser programs, and so forth, as well as applications specific to the embodiments and configurations discussed along with FIGS. 21-28, such as input device configuration software. The input-sensitive display device 2850 may also have a notification manager 2868 loaded in memory 2862, which executes on the processor 2860. The notification manager 2868 handles notification requests from the applications 2866.

The input-sensitive display device 2850 may have a power supply 2870, which is implemented as one or more batteries. The power supply 2870 might further include an external power source that overrides or recharges the built-in batteries, such as an AC adapter or a powered docking cradle.

The input-sensitive display device 2850 is also shown with an audio generator 2874, a microphone 2876, and an image capture system 2878. These devices are directly coupled to the power supply 2870 so that when activated, they remain on for a duration dictated by the notification mechanism even though the processor and other components might shut down to conserve battery power.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims. In particular, it is understood that various features described herein may be combined into various embodiments of the invention. For instance, features related to the digital pen functionality described along with FIG. 26 may be combined with the menu functionality of FIG. 27, which may reside in the non-separable configuration of input/output device 2240 shown in FIG. 22. However, in order to avoid excessive drawings showing many combinations of features for various embodiments, it is understood that the features and aspects described herein may be combined in various arrangements. It is further understood that various embodiments may be formed from separate units, such as a keyboard and an input-sensitive display device, which are combined to provide desired functionality. As such, the separate units may constitute a kit for providing an embodiment of the invention.

What is claimed is:

1. A method comprising:
   receiving a plurality of text units input into a computing device;
   determining a character variant that is phonetically similar to at least one of the plurality of text units;
   associating a first portion of a touch-sensitive display with the character variant, wherein the touch-sensitive display is in communicative contact with the computing device;
   receiving a first selection, by the touch-sensitive display, corresponding to the character variant;
   replacing at least one of the plurality of text units with the character variant;
   receiving, by the touch-sensitive display at a second portion of the touch-sensitive display, a second selection of the character variant;
   based at least upon receiving the second selection corresponding to the character variant, displaying at least one alternative character;
   receiving a third selection, by the touch-sensitive display to select one of the alternative characters; and
   replacing the character variant with the selected alternative character.

2. The method of claim 1, wherein the plurality of text units are input as Roman characters and the character variant is Chinese.

3. The method of claim 1, further comprising: receiving at least one toggle key selection, wherein receiving at least one toggle key selection provides a second plurality of alternative characters.

4. The method of claim 1, wherein receiving a selection, by the touch-sensitive display, comprises mapping the touch-sensitive display to correspond to a location of at least one text unit within the plurality of text units to be replaced by the character variant.

5. The method of claim 1, further comprising receiving a confirmation from a user, prior to replacing at least one of the plurality of text units, by receiving an actuation of an input element.

6. The method of claim 5, further comprising receiving the confirmation by detecting a tap at a portion of the touch-sensitive display corresponding to the location of the character variant.

7. The method of claim 1, further comprising receiving an indication of a user contact with the portion of the touch-sensitive display wherein receiving the indication of the user contact with the portion of the touch-sensitive display comprises receiving the indication from the touch-sensitive display having one of the following detection types: capacitive, resistive, and inductive.

8. A method of interacting with a computer system, the method comprising:
   receiving a plurality of text units input into a computing device;
   determining a character variant that is phonetically similar to at least one of the plurality of text units;
   associating portions of a touch-sensitive display with the character variant, wherein associating the portions of the touch-sensitive display comprises associating a first portion in a first line of text and associating a second portion located in a second line of text;
   receiving a first selection, by the touch-sensitive display, corresponding to the character variant;
   replacing at least one of the plurality of text units with the character variant;
   displaying the character variant at the respective portions of the touch-sensitive display;
   receiving, by the touch-sensitive display, a second selection of the character variant;
   based at least upon receiving the second selection corresponding to the character variant, displaying at least one alternative character;
   receiving a third selection, by the touch-sensitive display to select one of the alternative characters; and
   replacing the character variant with the selected alternative character.

9. The method of claim 8, wherein associating the first portion in the first line of text and associating the second portion located in the second line of text comprises mapping each of the plurality of text units to a detection point of the touch-sensitive display.

10. The method of claim 9, further comprising receiving an indication of a user contact with a portion of the touch-sensitive display wherein receiving the indication of the user contact with the portion of the touch-sensitive display comprises receiving the indication of the user contact at the detection point of the touch-sensitive display mapped to the portion of the text.

11. The method of claim 8, wherein associating the portions of the touch-sensitive display with the plurality of variations comprises, displaying, on the touch-sensitive display, an indication of the variation at the portion of the touch-sensitive display.

12. The method of claim 8, further comprising receiving an indication of a user contact with the portion of the touch-sensitive display, wherein receiving the indication of the user contact with the portion of the touch-sensitive display comprises detecting the indication of the user contact from the touch-sensitive display having one of the following detection types: capacitive, resistive, and inductive.

13. The method of claim 8, further comprising mapping portions of the text to detection points of the touch-sensitive display, and wherein receiving the selection of the portion of the text comprises receiving an indication of the user contact with a detection point of the touch-sensitive display mapped to the portion of the text.

14. A system comprising:
   a display device;
   a sensor configured to detect user contact;
   an input device coupled to the sensor; and
   a processing unit operatively associated with the sensor, the input device, and the display device, the processing unit being configured to:
      receive a plurality of text units input into a computing device;
      determine a character variant that is phonetically similar to at least one of the plurality of text units;
      associate a first portion of a touch-sensitive display with the character variant, wherein the touch-sensitive display is in communicative contact with the computing device;
      receive a first selection corresponding to the character variant;
      replace at least one of the plurality of text units with the character variant;
      receive, by the touch-sensitive display at a second portion of the touch-sensitive display, a second selection of the character variant;
      based at least upon receiving the second selection corresponding to the character variant, display at least one alternative character;
      receive a third selection to select one of the alternative characters; and
      replace the character variant with the selected alternative character.

15. The system of claim 14, wherein the processing unit is further configured to:
   display a plurality of alternative characters to replace the character variant; and
   display at least one character that is a synonym of one or more of the at least one phonetically similar character variants.

16. The system of claim 14, wherein the plurality of text units are input as Roman characters and the character variant is Korean.

17. The system of claim 14, wherein the plurality of text units are input as Roman characters and the character variant is Japanese.

18. The system of claim 14, wherein the plurality of text units are input as Roman characters and the character variant is Mandarin.

19. The system of claim 14, wherein the plurality of text units are input as Roman characters and the character variant is Pinyin.

20. The system of claim 14, wherein the processing unit is further configured to:
   receive confirmation that the text unit has been replaced; and
   return a cursor back to a prior position immediately before entering a text unit replacement mode.

* * * * *